(12) United States Patent
Hayakawa et al.

(10) Patent No.: US 11,325,363 B2
(45) Date of Patent: **\*May 10, 2022**

(54) LAMINATE INCLUDING POLYESTER FILM HAVING FURANDICARBOXYLATE UNIT AND HEAT-SEALABLE RESIN LAYER, AND PACKAGING BAG

(71) Applicants: TOYOBO CO., LTD., Osaka (JP); Furanix Technologies B.V., Amsterdam (NL)

(72) Inventors: Shota Hayakawa, Otsu (JP); Yukihiro Numata, Otsu (JP); Katsuya Ito, Otsu (JP); Jun Inagaki, Osaka (JP); Jesper Gabriel Van Berkel, Amsterdam (NL)

(73) Assignees: TOYOBO CO., LTD., Osaka (JP); Furanix Technologies B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/490,307

(22) PCT Filed: Feb. 28, 2018

(86) PCT No.: PCT/JP2018/007405
§ 371 (c)(1),
(2) Date: Aug. 30, 2019

(87) PCT Pub. No.: WO2018/159649
PCT Pub. Date: Sep. 7, 2018

(65) Prior Publication Data
US 2019/0389189 A1    Dec. 26, 2019

(30) Foreign Application Priority Data
Mar. 1, 2017    (WO) .................. PCT/JP2017/008201

(51) Int. Cl.
| | | |
|---|---|---|
| *B32B 27/36* | (2006.01) | |
| *B32B 27/08* | (2006.01) | |
| *C08G 63/137* | (2006.01) | |
| *C08L 67/02* | (2006.01) | |
| *C08G 63/12* | (2006.01) | |
| *C08G 63/16* | (2006.01) | |
| *C08G 63/18* | (2006.01) | |
| *C08G 63/127* | (2006.01) | |
| *C08G 63/123* | (2006.01) | |
| *C08J 7/052* | (2020.01) | |

(52) U.S. Cl.
CPC .............. *B32B 27/36* (2013.01); *B32B 27/08* (2013.01); *C08G 63/137* (2013.01); *C08L 67/02* (2013.01); *B32B 2250/02* (2013.01); *B32B 2307/518* (2013.01); *B32B 2307/704* (2013.01); *B32B 2307/724* (2013.01); *B32B 2307/7242* (2013.01); *B32B 2307/7244* (2013.01); *B32B 2309/105* (2013.01); *B32B 2367/00* (2013.01); *B32B 2439/46* (2013.01); *C08G 63/12* (2013.01); *C08G 63/123* (2013.01); *C08G 63/127* (2013.01); *C08G 63/16* (2013.01); *C08G 63/18* (2013.01); *C08G 2230/00* (2013.01); *C08J 7/052* (2020.01); *C08L 2203/16* (2013.01); *Y10T 428/2813* (2015.01); *Y10T 428/2817* (2015.01); *Y10T 428/31786* (2015.04)

(58) Field of Classification Search
None
See application file for complete search history.

(56) References Cited

U.S. PATENT DOCUMENTS

| | | | | |
|---|---|---|---|---|
| 2,551,731 A | | 5/1951 | Drewitt et al. | |
| 4,439,479 A | * | 3/1984 | Kanai ..................... | B05D 5/08 428/148 |
| 5,096,784 A | * | 3/1992 | Culbertson .......... | C09D 133/12 428/482 |
| 5,128,206 A | * | 7/1992 | Fiard ..................... | G11B 5/725 428/337 |

(Continued)

FOREIGN PATENT DOCUMENTS

| | | | |
|---|---|---|---|
| CN | 101899145 A | * | 12/2010 |
| CN | 101959941 A | | 1/2011 |

(Continued)

OTHER PUBLICATIONS

"The Furan Counterpart to Poly(ethylene terephthalate): An Alternative Material Based on Renewable Resources" Journal of Polymer Science: Part A: Polymer Chemistry, vol. 47, 295-298 (2009) (Year: 2009).*

(Continued)

*Primary Examiner* — Vivian Chen
(74) *Attorney, Agent, or Firm* — Leydig, Voit & Mayer, Ltd.

(57) ABSTRACT

An object is to provide a laminate having excellent lamination strength that includes a polyester film having a furandicarboxylate unit and a heat-sealable resin layer, and to provide a packaging bag including the same. A laminate including a polyester film and a heat-sealable resin layer, wherein the polyester film is a biaxially oriented polyester film containing a polyethylene furandicarboxylate resin composed of a furandicarboxylic acid and ethylene glycol, a plane orientation coefficient ΔP of the film is 0.100 or more and 0.160 or less, a thickness of the film is 1 μm or more and 300 μm or less, a heat shrinkage rate of the film is 10% or less when heated at 150° C. for 30 minutes, and lamination strength of the laminate is 2.0 N/15 mm or more.

4 Claims, 1 Drawing Sheet

(56) References Cited

U.S. PATENT DOCUMENTS

| | | | |
|---|---|---|---|
| 6,254,996 B1* | 7/2001 | Fukuda | C08J 7/0427 |
| | | | 428/480 |
| H1982 H * | 8/2001 | Dunn et al. | B05D 1/36 |
| | | | 427/258 |
| 10,407,555 B2* | 9/2019 | Inagaki | C08G 63/16 |
| 10,941,244 B2* | 3/2021 | Inagaki | C08J 7/044 |
| 2004/0146724 A1* | 7/2004 | Peiffer | B32B 27/20 |
| | | | 428/458 |
| 2005/0100723 A1* | 5/2005 | Tanaka | C08L 2666/18 |
| | | | 428/220 |
| 2008/0015108 A1* | 1/2008 | Yamamoto | B41M 5/41 |
| | | | 503/227 |
| 2008/0038539 A1* | 2/2008 | Yokota | B32B 33/00 |
| | | | 428/323 |
| 2009/0032602 A1 | 2/2009 | Nishi et al. | |
| 2009/0124763 A1 | 5/2009 | Matsuda et al. | |
| 2011/0218316 A1 | 9/2011 | Drysdale et al. | |
| 2012/0053317 A1* | 3/2012 | Matsumura | C08J 5/18 |
| | | | 528/279 |
| 2012/0178897 A1* | 7/2012 | Nozawa | H01L 31/049 |
| | | | 528/308.1 |
| 2012/0207956 A1 | 8/2012 | Matsuda et al. | |
| 2012/0258299 A1 | 10/2012 | Matsuda et al. | |
| 2012/0288692 A1 | 11/2012 | Broyles et al. | |
| 2012/0288693 A1 | 11/2012 | Stanley et al. | |
| 2013/0011631 A1* | 1/2013 | Sakellarides | B32B 27/36 |
| | | | 428/195.1 |
| 2013/0095271 A1* | 4/2013 | Carman, Jr. | C08G 63/199 |
| | | | 428/36.92 |
| 2013/0344345 A1* | 12/2013 | Sakellarides | C08K 5/3475 |
| | | | 428/458 |
| 2014/0004286 A1* | 1/2014 | Sakellarides | B32B 27/08 |
| | | | 428/36.6 |
| 2014/0099455 A1* | 4/2014 | Stanley | B32B 27/32 |
| | | | 428/34.3 |
| 2014/0234493 A1 | 8/2014 | Forloni | |
| 2014/0322463 A1 | 10/2014 | Bashir et al. | |
| 2014/0336349 A1* | 11/2014 | Sipos | C08G 63/672 |
| | | | 528/285 |
| 2014/0363546 A1* | 12/2014 | Zhou | B32B 27/308 |
| | | | 426/130 |
| 2015/0004387 A1* | 1/2015 | Sargeant | C09D 5/002 |
| | | | 428/220 |
| 2015/0119548 A1* | 4/2015 | Takahashi | B29D 7/01 |
| | | | 528/308.2 |
| 2015/0141584 A1* | 5/2015 | Saywell | C08G 63/181 |
| | | | 525/444 |
| 2015/0251395 A1 | 9/2015 | Haak et al. | |
| 2015/0307704 A1 | 10/2015 | Bhattacharjee et al. | |
| 2015/0343746 A1* | 12/2015 | Bhattacharjee | B32B 27/08 |
| | | | 428/212 |
| 2015/0353692 A1* | 12/2015 | Bhattacharjee | C08J 5/18 |
| | | | 428/457 |
| 2016/0002395 A1 | 1/2016 | Matsuda et al. | |
| 2016/0108171 A1* | 4/2016 | Haruta | B32B 27/32 |
| | | | 428/35.2 |
| 2016/0200862 A1* | 7/2016 | Bastioli | C08L 67/02 |
| | | | 524/47 |
| 2016/0272771 A1* | 9/2016 | Goto | B32B 27/18 |
| 2016/0319066 A1 | 11/2016 | Shimoharai et al. | |
| 2017/0297256 A1* | 10/2017 | Kolstad | B32B 27/32 |
| 2017/0368807 A1 | 12/2017 | Sakellarides et al. | |
| 2018/0170019 A1* | 6/2018 | Fayet | B32B 27/08 |
| 2018/0244878 A1 | 8/2018 | Inagaki et al. | |
| 2018/0311939 A1* | 11/2018 | Larrieu | B32B 27/10 |
| 2019/0106534 A1* | 4/2019 | Inagaki | C08J 7/0427 |
| 2019/0169384 A1 | 6/2019 | Goto et al. | |
| 2019/0225745 A1 | 7/2019 | Sakano et al. | |
| 2019/0366616 A1* | 12/2019 | Berny | B29C 51/002 |
| 2019/0389189 A1* | 12/2019 | Hayakawa | B32B 27/36 |
| 2020/0269559 A1* | 8/2020 | Inagaki | C08J 7/043 |
| 2020/0269560 A1* | 8/2020 | Inagaki | C08J 7/0423 |
| 2021/0016484 A1* | 1/2021 | Hayakawa | B29C 48/305 |
| 2021/0147618 A1* | 5/2021 | Inagaki | C08J 7/056 |

FOREIGN PATENT DOCUMENTS

| | | | |
|---|---|---|---|
| CN | 103459148 A | * | 12/2013 |
| CN | 104053535 A | * | 9/2014 |
| CN | 104955646 A | * | 9/2015 |
| CN | 105143967 A | * | 12/2015 |
| EP | 2511320 A1 | | 10/2012 |
| EP | 3438164 A1 | | 2/2019 |
| JP | 11-010725 A | * | 1/1999 |
| JP | 2000-119414 A | * | 4/2000 |
| JP | 2001-001399 A | | 1/2001 |
| JP | 2001-232739 A | * | 8/2001 |
| JP | 2001-342267 A | * | 12/2001 |
| JP | 2002-370277 A | * | 12/2002 |
| JP | 2003-071969 A | | 3/2003 |
| JP | 2003-200546 A | * | 7/2003 |
| JP | 2007-118476 A | * | 5/2007 |
| JP | 3982385 B2 | * | 9/2007 |
| JP | 4470491 B2 | * | 6/2010 |
| JP | 4881127 B2 | | 2/2012 |
| JP | 2012-094699 A | | 5/2012 |
| JP | 2012-229395 A | | 11/2012 |
| JP | 2013-155389 A | | 8/2013 |
| JP | 2015-157411 A | | 9/2013 |
| JP | 2014-043571 A | | 3/2014 |
| JP | 2014-073598 A | * | 4/2014 |
| JP | 2015-506389 A | | 3/2015 |
| JP | 2015-098612 A | | 5/2015 |
| TW | 200951163 A | | 12/2009 |
| TW | 201518399 A | | 5/2015 |
| TW | 2016-015742 A | * | 5/2016 |
| TW | 201615742 A | | 5/2016 |
| WO | WO 2012/142271 A1 | | 10/2012 |
| WO | WO 2013/097013 A1 | | 7/2013 |
| WO | WO 2014/100256 A2 | | 6/2014 |
| WO | WO 2014/100265 A1 | | 6/2014 |
| WO | WO 2015/093524 A1 | | 6/2015 |
| WO | WO 2016/032330 A | * | 3/2016 |
| WO | WO 2016/032330 A1 | | 3/2016 |
| WO | WO 2016/123209 A | * | 8/2016 |
| WO | WO 2017/038092 A1 | | 3/2017 |
| WO | WO 2017/115736 A1 | | 7/2017 |
| WO | WO 2017/115737 A1 | | 7/2017 |
| WO | WO 2017/169553 A1 | | 10/2017 |
| WO | WO 2018/012572 A1 | | 1/2018 |

OTHER PUBLICATIONS

Hachihama et al., "Synthesis of Polyesters containing Furan Ring," *Technology Reports of the Osaka University*, 8(333): 475-480 (1958).
Japanese Patent Office, International Search Report in International Patent Application No. PCT/JP2018/007405 (dated May 29, 2018).
Australian Patent Office, Examination Report in Australian Patent Application No. 2016381909 (dated May 5, 2020).
Australian Patent Office, Examination Report No. 1 in Australian Patent Application No. 2017242303 (dated Jun. 29, 2020).
China National Intellectual Property Administration, First Office Action in Chinese Patent Application No. 201680076574.4 (dated Aug. 21, 2019).
China National Intellectual Property Administration, First Office Action in Chinese Patent Application No. 201680076573.X (dated Aug. 30, 2019).
China National Intellectual Property Administration, The Second Office Action in Chinese Patent Application No. 201680076574.4 (dated Mar. 16, 2020).
European Patent Office, Extended European Search Report in European Patent Application No. 16881712.0 (dated Jun. 26, 2019).
European Patent Office, Extended European Search Report in European Patent Application No. 17774098.2 (dated Nov. 8, 2019).
European Patent Office, International Search Report in International Patent Application No. PCT/JP2016/003976 (dated Nov. 23, 2016).

(56) References Cited

OTHER PUBLICATIONS

Indian Patent Office, Examination Report in Indian Patent Application No. 201847027693 (dated May 15, 2020).
Japanese Patent Office, Notification of Reasons for Refusal in Japanese Patent Application No. 2017-506943 (dated Sep. 13, 2017).
Japanese Patent Office, International Search Report in International Patent Application No. PCT/JP2017/008902 (dated May 16, 2017).
Japanese Patent Office, International Search Report in International Patent Application No. PCT/JP2016/088617 (dated Mar. 21, 2017).
Japanese Patent Office, International Search Report in International Patent Application No. PCT/JP2016/088618 (dated Mar. 21, 2017).
Taiwan Intellectual Property Office, First Office Action in Taiwanese Patent Application No. 105143160 (dated Apr. 27, 2020).
Taiwan Intellectual Property Office, First Office Action in Taiwanese Patent Application No. 105143162 (dated Apr. 27, 2020).
Taiwan Intellectual Property Office, First Office Action in Taiwanese Patent Application No. 106107343 (dated Jun. 16, 2020).
Nakajima et al., "The Recent Developments in Biobased Polymers toward General and Engineering Applications: Polymers that Are Upgraded from Biodegradable Polymers, Analogous to Petroleum-Derived Polymers, and Newly Developed," *Polymers*, 9: 523 (2017).
Omnexus, "Polyethylene Furanoate (PEF)—The Rising Star Amongst Today's Bioplastics" (2019) [obtained at: https://omnexus.specialchem.com/selection-guide/polyethylene-furanoate-pef-bioplastic].
China National Intellectual Property Administration, First Office Action in Chinese Patent Application No. 201780021682.6 (dated Dec. 4, 2020).
China National Intellectual Property Administration, First Office Action in Chinese Patent Application No. 201880015127.7 (dated Oct. 22, 2020).
European Patent Office, Extended European Search Report in European Patent Application No. 18760798.1 (dated Dec. 8, 2020).
Japanese Patent Office, Notice of Reasons for Refusal in Japanese Patent Application No. 2017-559174 (dated Jan. 19, 2021).
Japanese Patent Office, Notice of Reasons for Refusal in Japanese Patent Application No. 2017-559175 (dated Jan. 19, 2021).
China National Intellectual Property Administration, Rejection Decision in Chinese Patent Application No. 201680076574.4 (dated Aug. 24, 2020).
European Patent Office, Communication Pursuant to Article 94(3) EPC in European Patent Application No. 16881711.2 (dated Nov. 4, 2020).
U.S. Appl. No. 16/089,693, filed Sep. 28, 2018, Pending.
China National Intellectual Property Administration, The Second Office Action in Chinese Patent Application No. 201880015127.7 (dated Apr. 8, 2021).
Japanese Patent Office, Notice of Reasons for Refusal in Japanese Patent Application No. 2018-508875 (dated Mar. 2, 2021).
Taiwan Intellectual Property Office, Second Office Action in Taiwanese Patent Application No. 105143160 (dated Mar. 30, 2021).
Taiwan Intellectual Property Office, First Office Action in Taiwanese Patent Application No. 109146750 (dated Apr. 30, 2021).
Taiwan Intellectual Property Office, First Office Action in Taiwanese Patent Application No. 107106833 (dated Apr. 16, 2021).
U.S. Appl. No. 15/756,909, filed Mar. 1, 2018, Patented.
U.S. Appl. No. 16/066,212, filed Jun. 26, 2018, Pending.
U.S. Appl. No. 16/066,232, filed Jun. 26, 2018, Pending.
U.S. Appl. No. 16/089,693, filed Sep. 28, 2018, Patented.
U.S. Appl. No. 16/490,205, filed Aug. 30, 2019, Pending.
U.S. Appl. No. 17/162,351, filed Jan. 29, 2021, Pending.
China National Intellectual Property Administration, The First Office Action in Chinese Patent Application No. 201880015158.2 (dated Jul. 6, 2021).
European Patent Office, Extended European Search Report in European Patent Application No. 18760795.7 (dated Dec. 11, 2020).
Japanese Patent Office, International Search Report in International Patent Application No. PCT/JP2018/007404 (dated May 29, 2018).
Japanese Patent Office, Notice of Reasons for Refusal in Japanese Patent Application No. 2019-503041 (dated Aug. 10, 2021).
Japanese Patent Office, Notice of Reasons for Refusal in Japanese Patent Application No. 2019-503042 (dated Aug. 10, 2021).
Korean Intellectual Property Office, Notice of Preliminary Rejection in Korean Patent Application No. 10-2019-7028221 (dated Sep. 9, 2021).
Korean Intellectual Property Office, Notice of Reason for Refusal in Korean Patent Application No. 10-2018-7030855 (dated Aug. 19, 2021).
Taiwanese Patent Office, First Office Action in Taiwanese Patent Application No. 107106834 (dated Jul. 20, 2021).
Taiwan Intellectual Property Office, Rejection Decision in Taiwanese Patent Application No. 105143162 (dated Jul. 21, 2021).
European Patent Office, Communication Pursuant to Article 94(3) EPC in European Patent Application No. 16767027.2 (dated Nov. 19, 2021).
Taiwan Intellectual Property Office, Rejection Decision in Taiwanese Patent Application No. 105143160 (dated Oct. 1, 2021).
Taiwan Intellectual Property Office, Rejection Decision in Taiwanese Patent Application No. 107106834 (dated Dec. 9, 2021).
Korean Intellectual Property Office, Notice of Preliminary Rejection in Korean Patent Application No. 10-2019-7028220 (dated Jan. 20, 2022).

\* cited by examiner

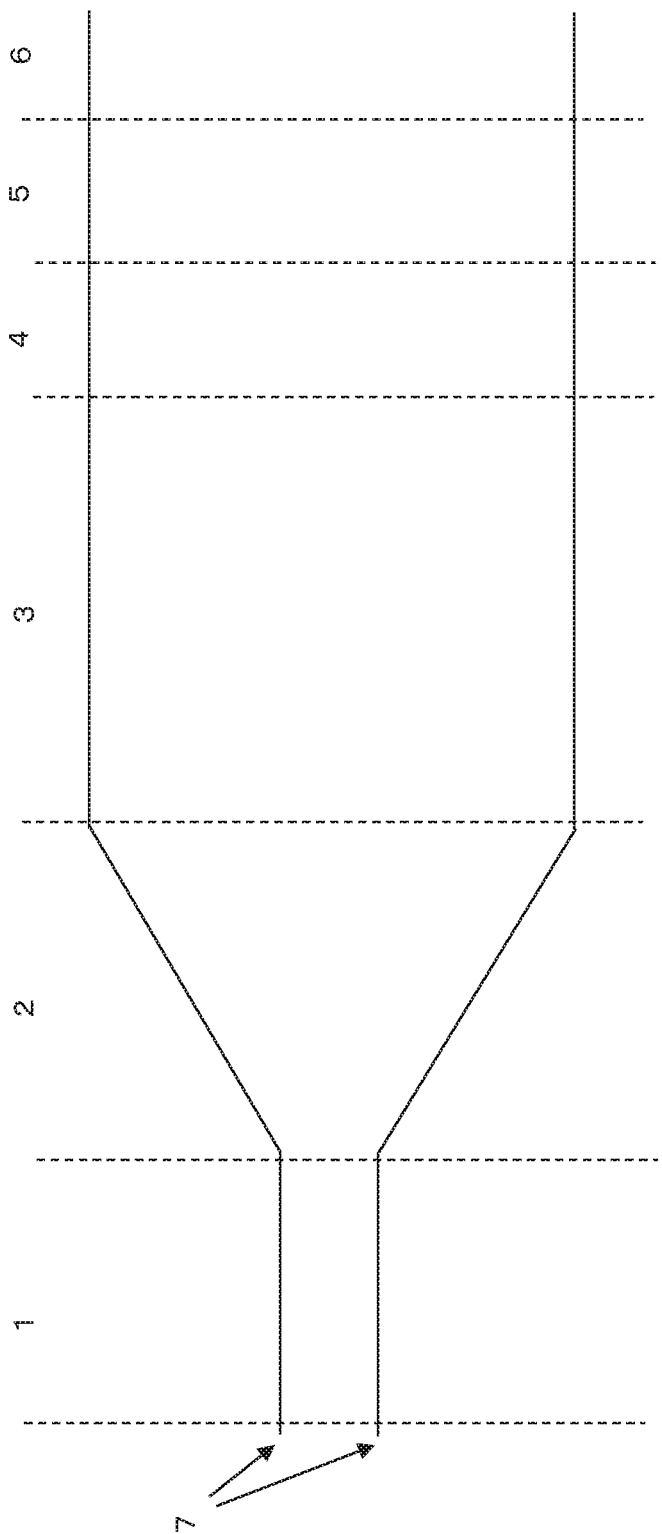

LAMINATE INCLUDING POLYESTER FILM HAVING FURANDICARBOXYLATE UNIT AND HEAT-SEALABLE RESIN LAYER, AND PACKAGING BAG

CROSS-REFERENCE TO RELATED APPLICATIONS

This patent application is the U.S. national phase of International Patent Application No. PCT/JP2018/007405, filed Feb. 28, 2018, which claims the benefit of International Patent Application No. PCT/JP2017/008201, filed on Mar. 1, 2017, which are incorporated by reference in their entireties herein.

TECHNICAL FIELD

The present invention relates to a laminate excellent in lamination strength including a polyester film having a furandicarboxylate unit and a heat-sealable resin layer, and a packaging bag including the same.

BACKGROUND ART

Polyester resins such as polyethylene terephthalate (PET) and polybutylene terephthalate (PBT), which are thermoplastic resins excellent in heat resistance and mechanical properties, have been used in a very wide variety of fields such as plastic films, electronics, energy, packaging materials, and automobiles. Among plastic films, biaxially stretched PET films have been used widely in industrial and packaging fields because of their excellent balance between cost and mechanical characteristic strength, heat resistance, dimensional stability, chemical resistance, optical characteristics, etc.

In the field of industrial films, biaxially stretched PET films can be used as functional films for flat panel displays (FPD) such as liquid crystal displays and plasma displays because of their excellent transparency. Furthermore, PET films to which hydrolysis resistance is imparted have been used as films for solar cell back sheets and also used for various purposes as functional films and base films.

In the field of packaging films, biaxially stretched PET films have been used for applications such as foodstuff packaging, shrink labels for bottles, and gas barrier films. Especially, films excellent in gas barrier properties have been used as packaging materials required to have airtightness for foodstuff, pharmaceutical products, electronic parts, and so on, or as gas shielding materials, and there has been a growing demand for such films in recent years.

On the other hand, resins having biodegradability and resins produced from biomass-derived raw materials have drawn attention as environmentally friendly-type or environmentally sustainable-type materials. From the above-mentioned viewpoint, many investigations have been carried out for the purpose of providing renewable polymers for replacing petroleum derivatives such as PET. As compounds that can substitute for terephthalic acid, which forms the backbone of PET, furanlicarboxylic acids (FDCAs) have been proposed, and furan-based PET equivalents in which FDCAs and diols are polycondensed have been proposed (Patent Document 1, Non-Patent Document 1).

Regarding thermoplastic resin compositions having several types of furamlicarboxylate units, typified by polybutylene furandicarboxylate (PBF), polymer compounds having a specified degree of polymerization and being usable for such applications as electric and electronic parts have been proposed (Patent Document 2). Furthermore, polyesters having specified reduced viscosity and terminal acid values and being excellent in mechanical strength have been proposed (Patent Documents 3 and 4).

Uniaxially stretched films produced from sheets obtained from PEF derivatives or blends of PEF derivatives and copolymerized polyesters or the like have been investigated (Patent Documents 5 and 6).

Patent Document 7 discloses a PEF film excellent in mechanical strength.

PRIOR ART DOCUMENTS

Patent Documents

Patent Document 1: U.S. Pat. No. 2,551,731
Patent Document 2: Japanese Patent No. 4881127
Patent Document 3: JP-A-2013-155389
Patent Document 4: JP-A-2015-098612
Patent Document 5: JP-T-2015-506389
Patent Document 6: JP-A-2012-229395
Patent Document 7: WO 2016/032330
Non-Patent Document 1: Y. Hachihama, T. Shono, and K. Hyono, Technol. Repts. Osaka Univ., 8, 475 (1958)

SUMMARY OF THE INVENTION

Problems to be Solved by the Invention

However, the only physical property of the polymers disclosed in Patent Document 1 is their melting point, and their mechanical strength is not specified. Therefore, it has been unclear whether or not thermoplastic resin compositions having a furandicarboxylate unit can be used in the fields of industrial and packaging films.

The hot press-molded products of PBF disclosed in Patent Document 2 have low transparency and therefore are limited for use in the fields of industrial and packaging films. Regarding the mechanical properties of 200 μm-thick sheet products having a polyethylene furandicarboxylate (PEF) structure disclosed in Patent Documents 3 and 4, both breaking elongation and breaking strength are low and it was inconceivable to use such sheet products in the fields of industrial and packaging films.

Patent Document 5 discloses that as compared with a sheet made of a thermoplastic resin composition having a furandicarboxylate unit, a film obtained by uniaxially stretching the sheet has an improved breaking elongation, depending on the kinds of the materials blended and the blending ratio. However, no significant improvement in breaking elongation is confirmed unless cyclohexanedimethanol-copolymerized PET, which is widely known to improve breaking elongation, is blended. It must be said that the effect derived from the blending ratio is limited and such films have not been used so far in the fields of industrial and packaging films.

Patent Document 6 discloses a PEF film uniaxially stretched about 1.6 times by using rolling rolls. Although the film disclosed is a plastic film excellent in gas barrier properties, this merely indicates the advantages of barrier properties derived from the chemical structure of PEF. Its mechanical strength, which is important for packaging materials, is not made clear, so that the film has not been used so far in the field of gas barrier film for packaging having a furandicarboxylate unit.

In Patent Document 7, only the improvement in the characteristics of a biaxially stretched polyester film containing a furandicarboxylate unit and a film having heat-sealability has been investigated.

As described above, the resin compositions having furandicarboxylate units proposed in the above-mentioned patent documents are under investigation as substitutions for PET. However, no investigation has been made on laminates in which a film having heat-sealability necessary for bag production so that applicability of the resin compositions in the fields of industrial and packaging films is unclear.

It is an object of the present invention to provide a laminate having excellent lamination strength that includes a polyester film having a furandicarboxylate unit and a heat-sealable resin layer, and to provide a packaging bag including the same. Preferably, it is an object of the present invention to provide a laminate further having excellent gas barrier properties, and a packaging bag including the same.

Solutions to the Problems

The gist of the present invention is as follows:
[1] A laminate comprising a polyester film and a heat-sealable resin layer, wherein
the polyester film is a biaxially oriented polyester film comprising a polyethylene furandicarboxylate resin composed of a furandicarboxylic acid and ethylene glycol,
a plane orientation coefficient ΔP of the film is 0.005 or more and 0.200 or less, a thickness of the film is 1 μm or more and 300 μm or less,
a heat shrinkage rate of the film is 10% or less when the film is heated at 150° C. for 30 minutes, and
lamination strength of the laminate is 2.0 N/15 mm or more.
[2] The laminate according to [1], wherein the laminate has an oxygen transmission of 1 mL/m$^2$/day/MPa or more and 200 mL/m$^2$/day/MPa or less under a temperature of 23° C. and a relative humidity of 65%.
[3] A packaging bag comprising the laminate according to [1] or [2].

Effects of the Invention

The laminate of the present invention can be used suitably as a packaging material because it is excellent in lamination strength. Moreover, the laminate of the present invention can provide packaging materials required to have air-tightness for foodstuff, pharmaceutical products, electronic parts, and so on because it is preferably excellent in gas barrier properties.

BRIEF DESCRIPTION OF THE DRAWING

FIG. 1 provides one example of a plan view illustrating a TD stretching step performed in a film production apparatus used for the present invention.

MODE FOR CARRYING OUT THE INVENTION (1) Polyester Film
The polyester film used for the present invention is a biaxially oriented polyester film comprising a polyethylene furandicarboxylate resin composed of a furanclicarboxylic acid and ethylene glycol.

The polyester film contains a polyethylene furandicarboxylate, which may hereinafter be referred to as PEF, resin composed of a furandicarboxylic acid and ethylene glycol. That is, the polyethylene furandicarboxylate resin is formed of a composition composed of a dicarboxylic acid component (furandicarboxylic acid) and a glycol component (ethylene glycol). The content of ethylene furandicarboxylate units in 100 mol % of all constituent units of the polyester is preferably more than 50 mol % and 100 mol % or less. The polyester may be a polyethylene furandicarboxylate-based resin in which other dicarboxylic acid component or glycol component is copolymerized to a degree that does not hinder the object of the present invention. The content of ethylene furandicarboxylate units is more preferably 70 mol % or more and 100 mol % or less, even more preferably 80 mol % or more and 100 mol % or less, further even more preferably 90 mol % or more and 100 mol % or less, particularly preferably 95 mol % or more and 100 mol % or less, and most preferably is 100 mol %.

The amount of the other dicarboxylic acid components and that of the glycol components to be copolymerized are preferably 20 mol % or less, more preferably 10 mol % or less, and particularly preferably 5 mol % or less in 100 mol % of all constituent units of the polyester.

Examples of the other dicarboxylic acid components include aromatic dicarboxylic acids such as terephthalic acid, isophthalic acid, phthalic acid, naphthalene dicarboxylic acid, 4,4'-dicarboxybiphenyl, and sodium 5-sulfoisophthalate; alicyclic dicarboxylic acids such as 1,4-cyclohexanedicarboxylic acid, 1,3-cyclohexanedicarboxylic acid, 1,2-cyclohexanedicarboxylic acid, 2,5-norbornenedicarboxylic acid, and tetrahydrophthalic acid; and aliphatic dicarboxylic acids such as oxalic acid, malonic acid, succinic acid, adipic acid, azelaic acid, sebacic acid, undecanedioic acid, dodecanedioic acid, octadecanedioic acid, fumaric acid, maleic acid, itaconic acid, mesaconic acid, citraconic acid, and dimer acid; and the like.

Examples of the other glycol components include aliphatic glycols such as 1,2-propanediol, 1,3-propanediol, 1,2-butanediol, 1,3-butanediol, 1,4-butanediol, 2-methyl-1,3-propanediol, 2-amino-2-ethyl-1,3-propanediol, 2-amino-2-methyl-1,3-propanediol, 1,10-decanediol, dimethyloltricyclodecane, diethylene glycol, and triethylene glycol; ethylene oxide adducts or propylene oxide adducts of bisphenol A, bisphenol S, bisphenol C, bisphenol Z, bisphenol AP, and 4,4'-biphenol; alicyclic glycols such as 1,2-cyclohexanedimethanol, 1,3-cyclohexanedimethanol, and 1,4-cyclohexanedimethanol; polyethylene glycol; polypropylene glycol; and the like.

A polymerization method for such a polyethylene furandicarboxylate-based resin can employ any optional production method such as a direct polymerization method in which a furandicarboxylic acid, ethylene glycol and, if necessary, other dicarboxylic acid components and diol components are reacted directly, and an transesterification method in which a dimethyl ester of a furandicarboxylic acid (including dimethyl esters of other dicarboxylic acids, if necessary) and ethylene glycol (including other diol components, if necessary) are subject to a transesterification reaction.

The polyester film of the present invention may contain other resins such as polyamide, polystyrene, polyolefin, and polyester other than those described above as components. The content of the other resins is preferably 30 mol % or less, more preferably 20 mol % or less, even more preferably 10 mol % or less, and further even more preferably 5 mol % or less, and most preferably 0 mol %, relative to all constituent units of the polyester film. In the present description, a film containing a resin other than polyesters is also called "polyester film."

The PEF film used for the present invention has a plane orientation coefficient (ΔP) of 0.005 or more and 0.200 or less, preferably 0.020 or more and 0.195 or less, more preferably 0.100 or more and 0.195 or less, even more preferably 0.110 or more and 0.195 or less, still even more preferably 0.120 or more and 0.195 or less, further still even more preferably 0.130 or more and 0.195 or less, particularly preferably 0.140 or more and 0.190 or less, and most preferably 0.140 or more and 0.160 or less.

The plane orientation coefficient (ΔP) of less than 0.005 is not preferable because it causes insufficient mechanical characteristics of the film. These insufficient mechanical properties may cause difficulty in performing post-processing such as printing on the film and bag production from the film and makes the film likely to be cut on a printer or a coater upon post-printing or post-coating. On the other hand, adjusting the plane orientation coefficient (ΔP) to 0.005 or more solves the above-mentioned problems and improves the gas barrier properties of the PEF film. Most preferably, adjusting the plane orientation coefficient (ΔP) to 0.160 or less yields sufficient mechanical strength.

The plane orientation coefficient can be calculated as follows. The refractive index (nx) in the machine direction (MD, longitudinal direction) of the film plane, the refractive index (ny) in the direction (TD, transverse direction) perpendicular to MD, and the refractive index (nz) in the thickness direction are measured in accordance with JIS K 7142-1996 5.1 (method A) with an Abbe refractometer in which a light source is a sodium D line. The plane orientation coefficient (ΔP) can be calculated based on the following equation:

$$\Delta P = \{(nx+ny)-2nz\} \div 2$$

The PEF film to be used for the present invention exhibits a heating shrinkage rate (hereinafter referred to as heat shrinkage rate) of 10% or less in both MD and TD when heated at 150° C. for 30 minutes. The heat shrinkage rate is preferably 8% or less, more preferably 4.5% or less, even more preferably 3.5% or less, still even more preferably 3.2% or less, further preferably 2.8% or less, and further more preferably 2.4% or less. A high heat shrinkage rate causes difficulty in performing printing or coating due to the occurrence of color deviation at the time of printing, and the occurrence of elongation of the film on a printer and a coater, and causes poor appearance due to deformation of the film by high temperature heating. Especially in the step of processing with a printer or a coater, the film tends to shrink in TD and appearance tends to be poor because of the absence of restraint between the rolls that convey a film. For this reason, the heat shrinkage rate in TD is preferably 1.8% or less, more preferably 1.5% or less, even more preferably 1.2% or less, still even more preferably 0.9% or less, and most preferably 0.6% or less. The lower heat shrinkage rate is better, but the heat shrinkage rate is preferably 0.01% or more in both MD and TD in terms of production.

The thickness of the polyester film having a furanclicarboxylate unit used for the present invention is 1 μm or more and 300 μm or less, preferably 5 μm or more and 200 μm or less, and more preferably 10 μm or more and 100 μm or less. The thickness exceeding 300 μm would be problematic in terms of cost and tends to lower visibility when the film is used as a packaging material. On the other hand, the thickness of less than 1 μm lowers the mechanical characteristics and thus might fail to exhibit functions imparted to the film and might lower the lamination strength.

In the PEF film to be used for the present invention, the oxygen transmission thereof at a temperature of 23° C. and a relative humidity of 65% is preferably 1 mL/m²/day/MPa or more and 1000 mL/m²/day/MPa or less, more preferably 500 mL/m²/day/MPa or less, even more preferably 200 mL/m²/day/MPa or less, and further even more preferably 120 mL/m²/day/MPa or less. The oxygen transmission exceeding 1000 mL/m²/day/MPa allows oxygen to degrade materials or causes poor preservation properties for foodstuff. The oxygen transmission is preferably 1 mL/m²/day/MPa or more in terms of production.

In the PEF film used for the present invention, the oxygen transmission per 50 μm of thickness at a temperature of 23° C. and a relative humidity of 65% is preferably 1 mL/m²/day/MPa or more and 200 mL/m²/day/MPa or less, more preferably 50 mL/m²/day/MPa or less, even more preferably 40 mL/m²/day/MPa or less, and further even more preferably 30 mL/m²/day/MPa or less. The oxygen transmission exceeding 200 mL/m²/day/MPa allows oxygen to degrade materials or causes poor preservation properties for foodstuff. The oxygen transmission is preferably 1 mL/m²/day/MPa or more in terms of production.

The oxygen transmission disclosed herein is the oxygen transmission of a substrate film itself, and naturally, it is possible to improve the oxygen transmission by subjecting the substrate film to coating, metal vapor deposition, metal oxide vapor deposition, sputtering, co-extrusion, and so on.

In the PEF film used for the present invention, the water vapor transmission thereof at a temperature of 37.8° C. and a relative humidity of 90% is preferably 0.1 g/m²/day or more and 40 g/m²/day or less, more preferably 30 g/m²/day or less, and even more preferably 20 g/m²/day or less. The water vapor transmission exceeding 40 g/m²/day allows water vapor to degrade materials or causes poor preservation properties for foodstuff. The water vapor transmission is preferably 0.1 g/m²/day or more in terms of production.

In the PEF film used for the present invention, the water vapor transmission per 50 μm of thickness at a temperature of 37.8° C. and a relative humidity of 90% is preferably 0.1 g/m²/day or more and 10 g/m²/day or less, more preferably 8 g/m²/day or less, even more preferably 5 g/m²/day or less, and further even more preferably 4 g/m²/day or less. The water vapor transmission exceeding 10 g/m²/day allows water vapor to degrade materials or causes poor preservation properties for foodstuff. The water vapor transmission is preferably 0.1 g/m²/day or more in terms of production.

The water vapor transmission disclosed herein is the water vapor transmission of a substrate film itself, and naturally, it is possible to improve the water vapor transmission by subjecting the substrate film to coating, metal vapor deposition, metal oxide vapor deposition, sputtering, co-extrusion, and so on.

In the film used for the present invention, PEF itself has a high oxygen barrier property (that is, low oxygen transmission), but enhancement of the oxygen barrier property is possible by introduction of a stretching step described below.

The intrinsic viscosity of the PEF preferably falls within a range of 0.30 dl/g or more and 1.20 dl/g or less, more preferably 0.55 dl/g or more and 1.00 dl/g or less, and even more preferably 0.70 dl/g or more and 0.95 dl/g or less. The intrinsic viscosity of less than 0.30 dl/g makes an obtained film likely to tear. The intrinsic viscosity of more than 1.20 dl/g increases the filtration pressure and makes high precision filtration difficult to be performed, causing difficulty in performing resin extrusion through a filter.

The refractive index (nx) in MD of the film plane and the refractive index (ny) in the direction perpendicular to MD are preferably 1.5700 or more, more preferably 1.5800 or more, even more preferably 1.5900 or more, further even more preferably 1.6000 or more, further preferably 1.6100 or more, and most preferably 1.6200 or more. It is preferable that both nx and ny be 1.5700 or more for the following reasons. Such values of nx and ny yields sufficient breaking strength and breaking elongation of the film, thus achieving satisfactory mechanical properties of the film. These satisfactory mechanical properties facilitates postprocessing such as printing on the film and bag production from the film and makes the film less likely to be cut on a printer or a coater upon post printing or post coating. The upper limit of the refractive indexes is preferably less than 1.7000 in terms of production and heat shrinkage rate.

The PEF film to be used for the present invention preferably has a breaking strength of 75 MPa or more in both MD and TD. The lower limit of the breaking strength is more preferably 100 MPa, even more preferably 150 MPa, still even more preferably 200 MPa, and further preferably 220 MPa. The breaking strength of less than 75 MPa is not preferable because it causes insufficient mechanical strength of the film and thus easily generates defects such as elongation and deviation in the film processing. In consideration of production, the upper limit is preferably 1000 MPa.

The PEF film to be used for the present invention preferably has a breaking elongation of 10% or more in both MD and TD. The lower limit of the breaking elongation is preferably 15%, more preferably 20%, and particularly preferably 30%. The breaking elongation of less than 10% is not preferable because it causes insufficient mechanical elongation of the film and thus easily generates defects such as cracking and tearing in the film processing. In consideration of production, the upper limit of the breaking elongation is preferably 300%. The upper limit of the breaking elongation is preferably 150%, more preferably 100%, and even more preferably 80%.

The static coefficient of friction ($\mu s$) of the PEF film used for the present invention is preferably 1.0 or less, and the dynamic coefficient of friction ($\mu d$) of the PEF film is preferably 1.0 or less. The static coefficient of friction ($\mu s$) is more preferably 0.8 or less, and even more preferably 0.6 or less. The dynamic coefficient of friction ($\mu d$) is more preferably 0.8 or less, and even more preferably 0.6 or less. Either the static coefficient of friction ($\mu s$) or the dynamic coefficient of friction ($\mu d$) that exceeds 1.0 impairs slipperiness and thus might generate scratches or wrinkles due to rubbing during running of the film. The static coefficient of friction ($\mu s$) is the static coefficient of friction of one side of the PEF film used for the present invention against the other side thereof. The dynamic coefficient of friction ($\mu d$) is the dynamic coefficient of friction of one side of the PEF film used for the present invention against the other side thereof.

The PEF film used for the present invention preferably has a total light transmittance of 85% or more. High transparency is desirable in order to improve the precision in detection of internal foreign matter that becomes a defect of the film. For this reason, the polyester film of the present invention having a furandicarboxylate unit preferably has a total light transmittance of 85% or more, more preferably 87% or more, and even more preferably 89% or more. The higher the total light transmittance is, the better it is in order to improve the precision in detection of internal foreign matter that becomes a defect of the film. However, a total light transmittance of 100% is technically difficult to achieve.

The PEF film used for the present invention preferably has a haze of 15% or less. Less opaque the film is desirable in order to inspect defects of its contents for packaging foodstuff. For this reason, the PEF film used for the present invention preferably has a haze of 15% or less, more preferably 7% or less, even more preferably 3% or less, and particularly preferably 1% or less. The lower haze is better, but the haze is preferably 0.1% or more in terms of the refractive index intrinsic to the PEF film.

The lower limit of the impact strength (impact resistance) per 15 μm thickness of the PEF film used for the present invention is preferably 0.4 J/15 μm, more preferably 0.6 J/15 μm, and even more preferably 0.8 J/15 μm. The impact strength of less than 0.4 J/15 μm may cause insufficient strength of the film in use as a bag. The upper limit of the impact strength is preferably 3.0 J/15 μm. The impact strength exceeding 3.0 J/15 μm may saturate the improving effect.

(2) Heat-Sealable Resin Layer

The heat-sealable resin layer used for the present invention may be any heat-sealable resin containing a resin that can adapt itself to the heat seal conditions of a packaging machine. That is, the heat-sealable resin may be any resin that can be sealed by a method of heat bonding with the heat and the pressure of a heat seal bar during processing such as bag production or by a method such as impulse sealing or ultrasonic sealing. Examples of the heat-sealable resin include polyolefin such as polyethylene such as low density polyethylene, medium density polyethylene, high density polyethylene, and linear low density polyethylene, and polypropylene, polystyrene, polyvinyl chloride, polyvinyl alcohol, ethylene-vinyl alcohol copolymers, ethylene-vinyl acetate copolymers, ethylene-acrylic acid copolymers, ethylene-ethyl acrylate copolymers, ionomers, and the like.

(3) Other Layers (3-1) Cover Layer

The laminate of the present invention may be provided with a cover layer in order to impart high transparency, excellent slipperiness, etc. to the PEF film used for the present invention. Upon forming a cover layer, the polyester film preferably has the cover layer on at least one side thereof. The cover layer may be formed on both sides of the polyester film and may be formed into a multilayer laminated structure in which one cover layer is formed on another cover layer. When the cover layer has the laminated structure, the layer of the outermost side (that is, the side opposing from the polyester film) preferably contains particles described below and more preferably contains inorganic particles described below.

The cover layer preferably contains at least one resin selected from the group consisting of polyester-based resins, urethane-based resins, and acrylic resins. The polyester resin, the urethane resin, and the acrylic resin have adhesion to the polyester film. The resins mentioned above may be used singly or in combination of two or more different resins such as polyester resin and urethane resin, polyester resin and acrylic resin, or urethane resin and acrylic resin.

(3-1) (a) Polyester Resin

Upon use of a copolymerized polyester as the polyester resin of the cover layer, the constituting components thereof preferably include an aromatic dicarboxylic acid component as the dicarboxylic acid component, and ethylene glycol and a branched glycol as the glycol component. Examples of the branched glycol include 2,2-dimethyl-1,3-propanediol (neopentyl glycol), 2-methyl-2-ethyl-1,3-propanediol, 2-methyl-2-butyl-1,3-propanediol, 2-methyl 2-propyl-1,3-propanediol, 2-methyl-2-isopropyl-1,3-propanediol, 2-methyl-2-n-hexyl-1,3-propanediol, 2,2-diethyl-1,3-propanethol, 2-ethyl-2-n-butyl-1,3-propanethol, 2-ethyl-2-n-hexyl-1,3-propanethol, 2,2-di-n-butyl-1,3-propanethol, 2-n-butyl-2-propyl-1,3-propanethol, and 2,2-di-n-hexyl-1,3-propanediol.

The lower limit of the molar ratio of the branched glycol component is preferably 10 mol %, more preferably 20 mol %, and even more preferably 30 mol %, relative to the whole glycol component. On the other hand, the upper limit is preferably 90 mol %, and more preferably 80 mol %. If necessary, diethylene glycol, propylene glycol, butanediol, hexanediol, 1,4-cyclohexanedimethanol or the like may be used in combination.

The aromatic dicarboxylic acid component is most preferably terephthalic acid, isophthalic acid, or furandicarboxylic acid. The aromatic dicarboxylic acid component may be composed of only terephthalic acid, isophthalic acid, and furandicarboxylic acid. Copolymerization may be carried out by adding other aromatic dicarboxylic acids, especially, aromatic dicarboxylic acids such as diphenyl carboxylic acid and 2,6-naphthalenedicarboxylic acid within a range up to 10 mol % relative to the whole dicarboxylic acid components.

Upon use of a polyester resin in the form of a waterborne coating liquid, a water-soluble or water-dispersible polyester-based resin is employed. In order to achieve such water-solubilization or water-dispersibilization, preference is given to copolymerization of a compound containing a sulfonic acid salt group or a compound containing a carboxylic acid salt group. In addition to the dicarboxylic acid component, it is preferable to use sulfoterephthalic acid, 5-sulfoisophthalic acid, 4-sulfonaphthaleneisophthalic acid-2,7-dicarboxylic acid, 5-(4-sulfophenoxy)isophthalic acid, their alkali metal salts, or the like within a range of 1 to 10 mol % relative to the whole dicarboxylic acid component in order to impart water-dispersibility to the polyester. More preference is given to 5-sulfoisophthalic acid or an alkali metal salt thereof.

(3-1) (b) Polyurethane Resin

The polyurethane resin of the cover layer may contain, as constituting components, at least a polyol component and a polyisocyanate component, and also may contain a chain extender, if necessary. Upon use of a thermal reaction type polyurethane resin, examples thereof include water-soluble or water-dispersible polyurethane in which a terminal isocyanate group is encapsulated (hereinafter expressed as "blocked") with an active hydrogen group.

Examples of the polyol component include polyester polyols obtainable from a reaction of a multivalent carboxylic acid (e.g., malonic acid, succinic acid, adipic acid, sebacic acid, fumaric acid, maleic acid, terephthalic acid, and isophthalic acid) or anhydride thereof with a polyhydric alcohol (e.g., ethylene glycol, diethylene glycol, triethylene glycol, propylene glycol, butanediol, 1,3-butanediol, 1,4-butanediol, 2,3-butanediol, neopentyl glycol, and 1,6-hexanediol), polyether polyols such as polyethylene glycol, polypropylene glycol, polyethylene propylene glycol, polytetramethylene ether glycol, and polyhexamethylene ether glycol, polycarbonate polyols, polyolefin polyols, and acrylic polyols.

Examples of the polyisocyanate, which is a constituting component of urethane resin, include aromatic diisocyanates such as tolylene diisocyanate and diphenylmethane-4,4-diisocyanate, aromatic aliphatic diisocyanates such as xylylene diisocyanate, alicyclic diisocyanates such as isophorone diisocyanate, 4,4-dicyclohexylmethane diisocyanate, and 1,3-bis(isocyanatemethyl)cyclohexane, aliphatic diisocyanates such as hexamethylene diisocyanate and 2,2,4-trimethylhexamethylene diisocyanate, and polyisocyanates prepared by adding one or more of the foregoing compounds to trimethylol propane or the like in advance. From the viewpoint of barrier properties, aromatic diisocyanates, araliphatic diisocyanates, and alicyclic diisocyanates are preferred. Moreover, when a cyclic portion has a substituent, the side chain of an aromatic ring or aliphatic ring is preferably a short chain. The isocyanate component having symmetry is preferable because it improves cohesion force.

Examples of the blocking agent for an isocyanate group include bisulfites, phenols, alcohols, lactams, oximes, and esters such as dimethyl malonate, diketones such as methyl acetoacetate, mercaptans, urea family compounds, imidazoles, acid imides such as succinic acid imide, amines such as diphenylamine, imines, and carbamates such as 2-oxazolidine. The water-soluble or water-dispersible polyurethane preferably has a hydrophilic group in its molecule. For this reason, preference is given to the compound having at least one active hydrogen atom in its molecule that has a hydrophilic group or given to a compound having hydrophilicity in a blocking agent. Examples of the compound having at least one active hydrogen atom in its molecule that has a hydrophilic group include taurine, dimethylol propionic acid, polyester polyols having a carboxylic acid group or a sulfonic acid group, and polyoxyalkylene polyols. Examples of the compound having hydrophilicity in a blocking agent include bisulfites and phenols containing a sulfonic acid group. If heat energy is added to the above-described resin during a drying or heat setting process in film production, the energy would separate a blocking agent from an isocyanate group. The separation causes the resin to fix a water-dispersible copolymerized polyester resin mixed to a network formed by self-crosslinking thereof and also to react with terminal groups or the like of the resin. In particular, the water-soluble or water-dispersible polyurethane is preferably one prepared by using a compound having hydrophilicity in a blocking agent. Such polyurethane in the course of the preparation of a coating liquid is poor in water resistance because it is hydrophilic, however, yields a coating film with good water resistance once a thermal reaction is completed via coating, drying, and heat-setting because of separation of the hydrophilic group, namely, the blocking agent.

The chemical constitution of a urethane prepolymer used in a polyurethane resin includes (i) a compound having at least two active hydrogen atoms in its molecule and having a molecular weight of 200 to 20,000, (ii) an organic polyisocyanate having two or more isocyanate groups in its molecule, and (iii) a compound obtained by reacting a chain extending agent having at least two active hydrogen atoms in its molecule, and having a terminal isocyanate group, which is contained if necessary.

The above (i) compounds having at least two active hydrogen atoms in its molecule and having a molecular weight of 200 to 20,000 are preferably commonly known compounds containing two or more hydroxyl groups, carboxyl groups, amino groups, or mercapto groups on their terminals or in their molecules. Particular preference is given to compounds such as polyether polyols and polyester polyols.

The polyester polyols can be prepared by condensing a polyvalent, saturated or unsaturated carboxylic acid or an anhydride of such a carboxylic acid as succinic acid, adipic acid, phthalic acid and maleic anhydride, with a polyhydric, saturated or unsaturated alcohol, such as ethylene glycol, diethylene glycol, 1,4-butanediol, neopentyl glycol, 1,6-hexanediol, and trimethylolpropane, a polyalkylene ether glycol, such as polyethylene glycol and polypropylene glycol, that have a relatively low molecular weight, or a mixture of such alcohols.

The polyester polyol may employ a polyester obtained from a lactone and a hydroxy acid, or a polyester polyol prepared by adding ethylene oxide, propylene oxide or the like to a polyester prepared in advance.

Examples of the organic polyisocyanate of the above (ii) include isomers of toluylene diisocyanate, aromatic diisocyanates such as 4,4-diphenylmethane diisocyanate, aromatic aliphatic diisocyanates such as xylylene diisocyanate, alicyclic diisocyanates such as isophorone diisocyanate and 4,4-dicyclohexylmethane diisocyanate, aliphatic diisocyanates such as hexamethylene diisocyanate and 2,2,4-trimethylhexamethylene diisocyanate, and polyisocyanates prepared by adding one or two or more of such compounds to trimethylolpropane or the like.

Examples of the chain extending agent of the above (iii) that has at least two active hydrogen atoms in its molecule include glycols such as ethylene glycol, diethylene glycol, 1,4-butanediol, and 1,6-hexanediol, polyhydric alcohols such as glycerol, trimethylolpropane, and pentaerythritol, diamines such as ethylenediamine, hexamethylenediamine, and piperazine, aminoalcohols such as monoethanolamine and diethanolamine, thiodiglycols such as thiodiethylene glycol, and water.

The urethane prepolymer is synthesized usually by performing a reaction by means of a single stage or multi-stage isocyanate polyaddition method using the above (i), the above (ii) and, if necessary, the above (iii), at a temperature of 150° C. or lower, preferably 70 to 120° C., for 5 minutes to several hours. The ratio of the isocyanate groups of the above (ii) to the active hydrogen atoms of the above (i) and (iii) may be 1 or more, but it is necessary to leave free isocyanate groups in the resulting urethane prepolymer. Moreover, the content of free isocyanate groups may be 10% by mass or less relative to the whole mass of the resulting urethane prepolymer, but the content is preferably 7% by mass or less considering stability of an aqueous solution of urethane polymer after blocking.

A urethane prepolymer is preferably subjected to blocking of a terminal isocyanate group with a bisulfite. The urethane prepolymer is mixed with an aqueous solution of a bisulfite and reacted for a period of about 5 minutes to about 1 hour while the mixture is stirred well. The reaction temperature is preferably adjusted to 60° C. or lower. Then, the reaction mixture is diluted with water to a proper concentration in order to form a thermal reaction type water-soluble urethane composition. The concentration and the viscosity of the composition are properly adjusted upon its use. When the composition is heated at a temperature of about 80 to about 200° C., a bisulfite as a blocking agent is usually dissociated to regenerate an active terminal isocyanate group. This dissociation stimulates a polyaddition that occurs in a molecule or between molecules of the prepolymer, producing a polyurethane polymer or imparting to the urethane prepolymer addition property to other functional groups.

(3-1) (c) Acrylic Resin

A water-dispersible or water-soluble acrylic resin can be used as the acrylic resin of the cover layer. Examples of the water-dispersible or water-soluble acrylic resin include at least one of acrylate and methacrylate resins, or copolymers of these resins with an aliphatic compound or aromatic compound being copolymerizable with an acrylic resin and having an unsaturated double bond, such as styrene. An acrylic styrene copolymerized resin excellent in hydrophilicity is the most preferably a water-dispersible acrylic styrene randomly copolymerized resin prepared by emulsion polymerization.

(3-1) (d) Particles

The cover layer preferably contains particles in order to improve scratch resistance or handling ability (e.g., slipping property, running property, blocking property, and property to purge accompanying air when winding up) in winding into a roll form and unwinding the roll. This makes the laminated polyester film of the present invention possible to obtain slipping property, winding property, and scratch resistance while maintaining high transparency.

Examples of such particles include inorganic particles and organic particles (heat-resistant polymer particles). The inorganic particles can employ calcium carbonate, calcium phosphate, amorphous silica, crystalline glass filler, kaolin, talc, titanium dioxide, alumina, silica-alumina mixed oxide, barium sulfate, calcium fluoride, lithium fluoride, zeolite, molybdenum sulfide, mica, etc. that have been processed to form particles. Examples of the organic particles include heat-resistant polymer particles such as crosslinked polystyrene particles, crosslinked acrylic resin particles, crosslinked methyl methacrylate-based particles, benzoguanamine-formaldehyde condensate particles, melamine-formaldehyde condensate particles, and polytetrafluoroethylene particles.

Of these particles, silica particles are preferred in terms of easy availability of a highly transparent film because of their refractive index relatively close to that of resin components. The shape of the particles is preferably approximately spherical from the viewpoint of imparting slipperiness, but not particularly limited thereto.

The content of the particles in the whole cover layer is preferably 20% by mass or less, more preferably 15% by mass or less, and particularly preferably 10% by mass or less. The content of the particles in the cover layer exceeding 20% by mass deteriorates transparency and easily causes insufficient adhesion of the film. On the other hand, the lower limit of the content of the particles is preferably 0.1% by mass, more preferably 1% by mass, and particularly preferably 3% by mass.

When the particles are of a single type or of two or more types, the average particle diameter of mainly used particles P is preferably 10 to 10000 nm, and particularly preferably 200 to 1000 nm. The particle P has the average particle diameter of less than 10 nm may deteriorate scratch resistance, slipping property, and winding property. On the other hand, the particles P having the average particle diameter exceeding 10000 nm are prone to come off and tend to cause high haze. When two or more types of particles are used and particles Q having a small average particle diameter are added as supplement, the average particle diameter of the particles Q is preferably 20 to 150 nm, and more preferably 40 to 60 nm. The average particle diameter of less than 20 nm not only causes difficulty in attaining sufficient blocking resistance but also tends to deteriorate scratch resistance.

When the particles P are silica particles, the particles P having the average particle diameter of 10 to 10000 nm are preferable because they make aggregates having an average primary particle diameter of 40 to 60 nm that are composed of silica prepared by a dry process less prone to come off from the cover layer. The reason for this is presumably that a flat stable shape can be formed by performing a stretching step and a heat fixation step after applying the cover layer in a film formation process. Moreover, the particles P are preferably particles capable of affording a ratio of the average particle diameter to the average primary particle diameter in an aggregated state (average particle diameter/average primary particle diameter in an aggregated state) of 4 times or more in terms of scratch resistance.

The particles may include two or more different types of particles or alternatively may include the same type of particles differing in average particle diameter.

The cover layer may contain a surfactant for the purposes of improving the leveling property upon coating, and defoaming a coating liquid. The surfactant may be any type, such as cationic, anionic, and nonionic, but preference is given to a silicone-based surfactant, an acetylene glycol-based surfactant, or a fluorine-based surfactant. The cover layer preferably contains such a surfactant to a degree that does not impair adhesion to a polyester film, for example, in an amount of 0.005 to 0.5% by mass in a coating liquid for forming the cover layer.

The cover layer may contain various types of additives in order to exhibit other functionalities. Examples of such additives include fluorescence dyes, fluorescent brighteners, plasticizers, UV absorbers, pigment dispersants, foam inhibitors, defoaming agents, antiseptic agents, and antistatic agents.

(3-2) Thin Film Layer

The laminate of the present invention may have a thin film layer in order to improve the gas barrier properties of a PEF film and impart flexibility to a PEF film. The thin film layer contains an inorganic compound as a main component. The inorganic compound is at least one of aluminum oxide and silicon oxide. The term "main component" as used herein means that the total content of aluminum oxide and silicon oxide is more than 50% by mass relative to 100% by mass of all components constituting the thin film layer. The total content is preferably 70% by mass or more, more preferably 90% by mass or more, and most preferably 100% by mass (that is, no component other than aluminum oxide and silicon oxide is contained as a component constituting the thin film layer). The aluminum oxide as used herein is composed of at least one of aluminum oxides such as AlO, $Al_2O$, and $Al_2O_3$. The content of each aluminum oxide may be controlled by adjusting the conditions of the preparation of the thin film layer. The silicon oxide as used herein is composed at least one of silicon oxides such as SiO, $SiO_2$, and $Si_3O_2$. The content of each silicon oxide may be controlled by adjusting the conditions of the preparation of the thin film layer. The aluminum oxide or the silicon oxide may contain, in the components thereof, other components in a slight amount (up to 3% by mass at most relative to all components) to a degree that does not impair their characteristics.

The thickness of the thin film layer is preferably 5 to 500 nm, more preferably 10 to 200 nm, and even more preferably 15 to 50 nm from the viewpoints of the gas barrier properties and the flexibility of a film, but not particularly limited thereto. The thin film layer having thickness of less than 5 nm might make desired gas barrier properties difficult to attain. On the other hand, the thickness exceeding 500 nm fails to achieve an improving effect on the gas barrier properties corresponding thereto, being disadvantageous in terms of folding resistance and production cost.

(3-3) Others

The laminate of the present invention may have other layer than the PEF film, the cover layer, and the thin film layer, if necessary for improvement in characteristics. Examples thereof include a biaxially stretched polyamide film, a polyvinylidene chloride film, a polymetaxylene adipamide film, a biaxially stretched polyethylene terephtalate film, which is effective for improvement in impact-resistant strength.

(4) Laminate

The laminate of the present invention includes a biaxially oriented polyester film composed of a polyethylene furamlicarboxylate-based resin, and a heat-sealable resin layer. The laminate of the present invention may also have other layers as described above. That is, the laminate of the present invention is not limited to have only two layers and may have a laminate structure including three or more layers.

Examples of the two-layer structure of the laminate of the present invention include structures such as PEF/LLDPE, PEF/CPP, vapor deposited PEF/LLDPE, and vapor deposited PEF/CPP, where PEF denotes the polyester film having a furandicarboxylate unit in the present invention, vapor deposited PEF denotes a PEF film vapor-deposited with aluminum oxide or silicon oxide, LLDPE denotes a linear low density polyethylene-based film, and CPP denotes an unstretched polypropylene film.

Examples of the three-layer structure of the laminate of the present invention include structures such as PEF/Al/LLDPE, PEF/Al/CPP, DPET/PEF/LLDPE, DPET/PEF/CPP, PEF/ONY/LLDPE, PEF/ONY/CPP, ONY/PEF/LLDPE, ONY/PEF/CPP, vapor deposited DPET/PEF/LLDPE, vapor deposited DPET/PEF/CPP, PEF/vapor deposited DPET/LLDPE, PEF/vapor deposited DPET/CPP, DPET/vapor deposited PEF/LLDPE, DPET/vapor deposited PEF/CPP, vapor deposited PEF/DPET/LLDPE, vapor deposited PEF/DPET/CPP, ONY/vapor deposited PEF/LLDPE, ONY/vapor deposited PEF/CPP, vapor deposited PEF/ONY/LLDPE, vapor deposited PEF/ONY/CPP, PEF/PVDC/LLDPE, PEF/PVDC/CPP, PEF/EVOH/LLDPE, PEF/EVOH/CPP, and PEF/MXD6/LLDPE, where Al denotes an aluminum foil, DPET denotes a biaxially stretched polyethylene terephthalate film, vapor deposited DPET denotes a DPET film vapor-deposited with aluminum oxide or silicon oxide, ONY denotes a biaxially stretched polyamide film, PVDC denotes a polyvinylidene chloride film, and EVOH denotes an ethylene-vinyl alcohol copolymer film.

Examples of the four-layer structure of the laminate of the present invention include structures such as PEF/ONY/Al/LLDPE, PEF/ONY/Al/CPP, DPET/Al/PEF/CPP, DPET/Al/PEF/LLDPE, and PEF/MXD6/CPP, where MXD6 denotes a polymetaxylene adipamide film.

The lamination strength of the laminate of the present invention is 2.0 N/15 mm or more, preferably 2.5 N/15 mm or more, more preferably 3.0 N/15 mm or more, and even more preferably 3.5 N/15 mm or more. The lamination strength of less than 2.0 N/15 mm may easily cause breakage of heat-sealed bags with contents inside after bag production when the bags are transported in a state of being stacked on one another, when pressure that comes from contact with each other is applied to them or when they are fallen from a high position. The upper limit of the lamination strength is preferably 15 N/15 mm.

The oxygen transmission of the laminate of the present invention at a temperature of 23° C. and a relative humidity of 65% is preferably 1 $mL/m^2/day/MPa$ or more and 200 $mL/m^2/day/MPa$ or less, more preferably 150 $mL/m^2/day/MPa$ or less, even more preferably 120 $mL/m^2/day/MPa$ or less, still even more preferably 90 $mL/m^2/day/MPa$ or less, and particularly preferably 80 $mL/m^2/day/MPa$ or less.

The oxygen transmission exceeding 200 $mL/m^2/day/MPa$ allows oxygen to degrade materials or causes poor preservation properties for foodstuff. The oxygen transmission is preferably 1 $mL/m^2/day/MPa$ or more in terms of production.

The water vapor transmission of the laminate of the present invention at a temperature of 37.8° C. and a relative humidity of 90% is preferably 0.1 g/m²/day or more and 10 g/m²/day or less, more preferably 8.0 g/m²/day or less, even more preferably 6 g/m²/day or less, and still even more preferably 4 g/m²/day or less. The water vapor transmission exceeding 10 g/m²/day allows water vapor to degrade materials or causes poor preservation properties for foodstuff. The water vapor transmission is preferably 0.1 g/m²/day or more in terms of production.

The heat seal strength of the laminate of the present invention can be a sufficiently high value without any treatment to a surface of the polyester film having a furandicarboxylate unit of the present invention, but adhesion strength of the laminate can be enhanced by corona treatment, plasma treatment, or anchor coating.

(5) Packaging Bag

The laminate of the present invention can be processed into a bag to obtain a packaging bag. Examples of a packaging body include a bag, a lid, a cup, a tube, a standing pouch, and a tray. The shape and the type thereof are not limited, and examples of the packaging mode of bags include a pillow type, three-side seal, and four-side seal. The laminate of the present invention is used as the entire or a part of such packaging materials and packaging bodies.

(6) Method for Producing Laminate

Next, the method of producing the laminate of the present invention will be described. First, the method for producing the polyester film having a furandicarboxylate unit used for the present invention is described. A representative example of using PEF pellets will be described in detail, but naturally, the present invention is not limited thereto.

First, film raw materials are dried or hot-air dried to adjust the water content of the raw materials to less than 100 ppm. Next, the respective raw materials are weighed and mixed, and the mixture is supplied to an extruder, and then melt-extruded into a sheet-like form. The sheet in a molten state is closely attached to a rotary metal roll (casting roll) by an electrostatic application method and then is cooled and solidified, to obtain an unstretched PEF sheet.

At an optional site where the molten resin is kept at 220 to 300° C., high precision filtration is performed in order to remove a foreign matter contained in the resin. A filter medium used for the high precision filtration of the molten resin is not limited, but a filter medium made of sintered stainless steel is suitable because it has excellent performance of removing agglomerates containing Si, Ti, Sb, Ge or Cu as main components and high melting point organic matters.

Upon layering a surface layer (a layer) and an intermediate layer (b layer) by co-extrusion, raw materials for the respective layers are extruded with two or more extruders. Both of the resultant layers are joined with a multilayer feed block (e.g., joining block having a rectangular joining part). The joined product is extruded into a sheet-like form from a slit-like die, and cooled and solidified on a casting roll to obtain an unstretched film. Alternatively, a multi-manifold die may be used in place of the multilayer feed block.

Next, the unstretched film obtained in the above-described manner is biaxially stretched and successively subjected to heat fixation.

For example, production of a biaxially oriented polyester film having a furandicarboxylate unit can employ a sequential biaxial stretching method in which uniaxial stretching is performed in MD or TD and then stretching is performed in the perpendicular direction; a simultaneous biaxial stretching method in which stretching is performed simultaneously in both MD and TD; and a method in which a linear motor is used as driving means at the time of simultaneous biaxial stretching. In the sequential biaxial stretching method, the MD stretching can be performed by making a speed difference with use of heating rolls, thereby stretching a sheet in MD. An infrared heater or the like may be used in combination for heating. The TD stretching to be carried out successively can be performed by leading the longitudinally stretched sheet to a tenter, holding both edges of the stretched sheet with clips, and stretching the sheet in TD while heating it. The film resulting after the TD stretching is contiguously subjected to heat fixation in the tenter. The heat fixation may be performed while the film is kept stretched in TD, or may be performed while the film is allowed to release in TD. The film resulting after the heat fixation can be cut off at its both edges and then wound by a winder.

Patent Documents 5 and 6 disclose a production method for a PEF film uniaxially stretched at 1.6 to 5.0 times. However, the disclosed method cannot provide mechanical characteristics sufficient for industrial and packaging applications. Accordingly, the present inventors have carried out investigations and consequently have attained high mechanical characteristics by performing the following stretching methods.

(6-1) Control of Stretch Ratio in MD of Film

It is preferable to perform stretching in MD in a range of 1.1 to 10.0 times in order to obtain a polyester film used for the present invention. A film having a plane orientation coefficient ΔP of 0.005 or more can be prepared by stretching in MD at 1.1 times or more. The stretch ratio in MD is preferably 1.5 times or more, more preferably 2.5 times or more, even more preferably 3.5 times or more, still even more preferably 3.8 times or more, particularly preferably 4.0 times or more, and most preferably 4.5 times or more. By setting the stretch ratio in MD to 2.5 times or more, the ΔP is made to be 0.02 or more and the refractive indexes nx and ny in MD and TD are made to be 1.5700 or more. These values enable formation of a film excellent in dynamic characteristics having a film breaking strength of 100 MPa or more and a film breaking elongation of 15% or more. The stretch ratio in MD of 10.0 times or less is preferable because such a ratio lowers the frequency of breaking the film. A higher stretch ratio in MD allows higher temperature of the heat fixation step, thus being able to reduce a heat shrinkage rate.

(6-2) Control of Stretch Temperature in MD of Film

It is preferable to perform stretching in MD in a range of 90° C. or higher and 150° C. or lower in order to obtain a polyester film used for the present invention. The temperature is more preferably 100° C. or higher and 125° C. or lower. The stretch temperature in MD of 90° C. or higher is preferable because such a temperature lowers the frequency of breaking the film. The stretch temperature of 150° C. or lower is preferable because such a temperature enables uniform stretching.

Next, steps after the stretching in TD will be explained with reference to FIG. 1. FIG. 1 provides one example of a plan view illustrating a TD stretching step performed in a film production apparatus used for the present invention. The film resulting from the MD stretching is held at its both edges with clips 7 and is led to a downstream winding step through a preheating zone 1, a stretching zone 2, a heat fixation zone 3, release zones 4, 5, and a cooling zone 6. However, the above-mentioned step is not limited to this.

(6-3) Control of Stretch Ratio in TD of Film

It is preferable to perform stretching in TD in a range of 1.1 to 10.0 times in order to obtain a polyester film having a furandicarboxylate unit of the present invention. A film having a plane orientation coefficient ΔP of 0.005 or more can be prepared by stretching in TD at 1.1 times or more. The stretch ratio in TD is more preferably 3.0 times or more, even more preferably 3.5 times or more, still even more preferably 4 times or more, and particularly preferably 4.5 times or more. By setting the stretch ratio in TD to 3.0 times or more, the plane orientation coefficient ΔP is made to be 0.02 or more and the refractive indexes nx and ny in MD and TD are made to be 1.5700 or more. These values enable formation of a film that is excellent in dynamic characteristics and has having a film breaking strength of 75 MPa or more and a film breaking elongation of 15% or more. The stretch ratio in TD of 10.0 times or less is preferable because such a ratio lowers the frequency of breaking the film.

(6-4) Control of Stretch Temperature in TD of Film

It is preferable to perform stretching in TD in a range of 80° C. or higher and 200° C. or lower in order to obtain a polyester film having a furandicarboxylate unit of the present invention. The temperature is more preferably 95° C. or higher and 135° C. or lower. The stretch temperature in the width direction of 80° C. or higher is preferable because such a temperature lowers the frequency of breaking the film. The stretch temperature of 200° C. or lower is preferable because such a temperature enables uniform stretching.

(6-5) Control of Heat Fixation Temperature of Film

It is preferable to perform a heat fixation treatment in a range of 110° C. or higher and 210° C. or lower in order to obtain a polyester film having a furandicarboxylate unit of the present invention. The temperature of 210° C. or lower for the heat fixation treatment is preferable because such a temperature makes the film hardly become opaque and lowers the frequency of melt breaking of the film. On the other hand, because increasing the heat fixation temperature lowers the heat shrinkage rate, the heat fixation temperature is preferably 110° C. or higher, more preferably 120° C. or higher, even more preferably 140° C. or higher, still even more preferably 160° C. or higher, and particularly preferably 175° C. or higher. The plane orientation coefficient ΔP tends to be increased by the heat fixation treatment.

In the present invention, a relaxation treatment in TD; at least either of a release treatment in TD or a release treatment in MD, is performed after the above-described heat fixation treatment. Specific examples include a method of performing only a relaxation treatment in TD after the heat fixation treatment; a method of performing only a release treatment in TD or MD after the heat fixation treatment; and a method of performing a relaxation treatment in TD after the heat fixation treatment and then performing a release treatment in TD or MD.

(6-6) Control of Relaxation Temperature in TD

Upon a relaxation treatment in TD, it is preferable to perform the relaxation treatment in TD in a range of 100° C. or higher and 200° C. or lower in order to obtain a polyester film having a furandicarboxylate unit of the present invention. The temperature is more preferably 165° C. or higher and 195° C. or lower. Such a temperature is preferable because it can lower the heat shrinkage rate.

(6-7) Control of Relaxation Ratio in TD

Upon a relaxation treatment in TD, it is preferable to perform the treatment in a range of relaxation ratio in TD of 0.5% or more and 10.0% or less in order to obtain a polyester film having a furandicarboxylate unit of the present invention. The relaxation ratio is more preferably 2% or more and 6% or less. The relaxation ratio set to be 0.5% or more is preferable because this can lower the heat shrinkage rate.

(6-8) Release Treatment

It is preferable to apply a release treatment to a film subjected to crystallization by the highest temperature of the heat fixation zone 3 because a residual stretch stress can be removed moderately. For example, in the case of performing only a release treatment without performing a relaxation treatment, it is preferable to separate film edges in the release zone 4 immediately after the film passes through the highest temperature part by the heat fixation treatment of the heat fixation zone 3 as shown in FIG. 1, and then perform heat fixation in MD and TD (in this case, film edges are not separated in the subsequent release zone 5); or to separate film edges in the release zone 5 immediately after performing release in the release zone 4, and then perform a release treatment in MD and TD. This can keep the heat shrinkage rate at a low level. After cooling, a release treatment in TD may be performed by adjusting the drawing speed in the winding step to be slower than the film formation speed in TD stretching, but a release treatment is preferably applied to a film without cooling the film after the film passes through the highest temperature of the heat fixation zone 3.

(6-8) (A) Control of Release Treatment Temperature

The temperature of the release zone 4 or 5 is preferably 140° C. or higher and 200° C. or lower, and more preferably 160° C. or higher and 180° C. or lower. The temperature of the release zone 4 or 5 of 140° C. or higher and 200° C. or lower is preferable because such a temperature lowers the maximum value of the heat shrinkage rate upon heating at 150° C. for 30 minutes. A release treatment at a temperature lower than 140° C. is hard to lower the shrinkage rate in all directions upon heating at 150° C. for 30 minutes. A release treatment at a temperature exceeding 200° C. may lower the elastic modulus of a film, thus deteriorating the planarity of the film.

(6-8) (B) Control of Release Treatment Rate

In the case of separating film edges without cooling the film after the film passes through the highest temperature part by the heat fixation treatment of the heat fixation zone 3, the heat shrinkage rate in the transverse direction will be extremely low by the release treatment temperature control because the film is released freely in the transverse direction. Because the longitudinal release rate defined by the following formula (1) is correlated with the heat shrinkage rate in the longitudinal direction, the longitudinal release rate is preferably 1.0% or more and 15.0% or less, and more preferably 3.0% or more and 10.0% or less. The longitudinal release rate of 15.0% or less is preferable because such a rate allows the resulting film to exhibit excellent planarity. The longitudinal release rate of 1.0% or more is preferable because such a rate lowers the maximum value of the heat shrinkage rate.

Longitudinal release rate=(Film speed before edge separation−Film speed in winding step)÷(Film speed before edge separation)×100(%)  (1)

(6-8) (C) Method of Separating Film Edges in In-Step Release Treatment

The method for separating film edges may employ a method in which a cutting blade is mounted in the release zone 4 or 5 and edges are cut and separated therewith, a method in which film edges are released from clips in the release zone 4 or the like, but not particularly limited thereto. Preference is given to the method in which film edges are released from clips in the release zone 4 or 5 because it enables stable release treatment regardless of the longitudinal release rate.

The film used for the present invention is prepared by the method described above, but the production of the film is not limited to the above specifically disclosed method as long as it belongs to the scope of the above described technical idea.

It is important for the production of the film to be used for the present invention that the production conditions described above are controlled precisely in the extremely narrow ranges based on the technical idea described above.

In the film used for the present invention, the stretching conditions and the heat fixation conditions described above individually or in combination can control the breaking strength, breaking elongation, and heat shrinkage rate of the film. The conditions may be selected optionally, but a combination of the preferable conditions described above can form a film having a plane orientation coefficient ($\Delta P$) of 0.005 or more, a heat shrinkage rate of 10% or less, preferably 8% or less, a preferred film breaking strength of 75 MPa or more, and a preferred breaking elongation of 10% or more. For example, it is effective to render both the longitudinal stretch ratio and the transverse stretch ratio high and perform the heat fixation treatment at a higher temperature.

During the stretching step or after the completion of the stretching of the film, a corona treatment or a plasma treatment can be performed. Slipping property can be imparted to the film by incorporating lubricant particles into the film. It is also possible to impart slipping property, anti-blocking property, antistatic property, easy adhesive property, etc. by coating the film with a liquid in a solvent or a dispersion liquid prepared by mixing resins, crosslinking agents, particles, etc., appropriately. Various stabilizers, pigments, UV absorbers, etc. may be contained in the film to be used for the present invention.

Moreover, surface treatment of the film that has been subjected to stretching and heat fixation can improve the functions of the film. Examples of the surface treatment include printing, coating, metal vapor deposition, metal oxide vapor deposition, and sputtering treatment.

The method for laminating the heat-sealable resin layer is preferably dry lamination, extrusion lamination, or the like, but not particularly limited thereto. Moreover, it is also allowed to apply print for the purpose of decoration or explaining the contents, or laminate an aesthetic film, a reinforcing material, or the like.

The adhesive used for lamination in the present invention may be any adhesive that plays a role in adhering a polyester film or the like to a heat-sealable resin layer (sealant film). The adhesives are commonly polyurethane-based adhesives, polyester-based adhesives, polyethylene imine, alkyl titanates, etc.

The cover layer preferably used for the laminate of the present invention can be formed on, for example, at least one side of a polyester film, by applying a coating liquid for cover layer formation containing a solvent, particles, and a resin in an optional stage in the production process of the laminate. It is preferable to form the cover layer by applying a coating liquid for cover layer formation to an unstretched or uniaxially stretched polyester film, drying it, then stretching it at least uniaxially, and subsequently subjecting it to a heat treatment. Examples of the solvent include organic solvents such as toluene, water, and mixed solvents of water with a water-soluble organic solvent, but preference is given to water itself or a mixture of water with a water-soluble organic solvent in terms of environmental problems.

A method for applying the coating liquid for cover layer formation to a film can employ any known method. Examples of the method include a reverse roll coating method, a gravure coating method, a kiss coating method, a die coater method, a roll brush method, a spray coating method, an air-knife coating method, a wire bar coating method, a pipe doctor method, an impregnation coating method, and a curtain coating method. Coating is performed by using such methods singly or in combination.

The preparation of the thin film layer preferably used for the laminate of the present invention appropriately employs conventional methods such as PVD methods (physical vapor deposition methods) including a vacuum vapor deposition method, a sputtering method, and an ion plating method, or CVD methods (chemical vapor deposition methods). Physical vapor deposition methods are preferable, and more preference is given to a vacuum vapor deposition method. For example, in the vacuum vapor deposition method, a vapor deposition source material is a mixture of $Al_2O_3$ and $SiO_2$, a mixture of Al and $SiO_2$, or the like, and a heating method can employ resistance heating, high frequency induction heating, electron beam heating, etc. Also, reactive vapor deposition may be employed. In the reactive vapor deposition, oxygen, nitrogen, water vapor or the like is introduced as reactant gas or a means of ozone addition, ion assistance or the like is used. Moreover, the production conditions may be modified to a degree that does not disturb the object of the present invention. Examples of the modification include addition of a bias or the like to a substrate, and raising or cooling the temperature of a substrate. This applies also to other production methods such as the sputtering method and the CVD methods.

The present application claims benefit of the priority based on International Patent Application No. PCT/JP2017/008201 filed on Mar. 1, 2017. The disclosure of the specification of International Patent Application No. PCT/JP2017/008201 filed on Mar. 1, 2017 is incorporated herein by reference in its entirety.

EXAMPLES

Next, the effects of the present invention will be explained with reference to Examples and Comparative Examples. First, the methods for evaluating characteristic values used in the present invention will be described as follows.

(1) Breaking Strength and Breaking Elongation

Strip form samples of 140 mm length and 10 mm width were cut out from films with a single-edged razor, the length and width of the strip form samples corresponded to the MD and TD of the films. Subsequently, each strip form sample was pulled with an Autograph AG-IS (manufactured by Shimadzu Corporation). From the obtained load-strain curve, the breaking strength (MPa) and the breaking elongation (%) in the respective directions were determined.

The measurement was performed under conditions represented by an atmosphere of 25° C., a chuck distance of 40 mm, a crosshead speed of 100 mm/min, and a load cell of 1 kN. The measurement was repeated 5 times and the average value thereof was employed.

(2) Plane Orientation Coefficient ($\Delta P$)

The plane orientation coefficient ($\Delta P$) was calculated by the following method. The refractive index (nx) in the longitudinal direction of the film plane, the refractive index (ny) in the direction perpendicular to MD, and the refractive index (nz) in the thickness direction were measured in accordance with JIS K 7142-1996 5.1 (method A) with an Abbe refractometer in which a light source was a sodium D line, and the plane orientation coefficient ($\Delta P$) was calculated based on the following equation:

$$\Delta P = \{(nx+ny) - 2nz\} \div 2$$

(3) Total Light Transmittance and Haze

The measurement was carried out in accordance with JIS K 7136-2000 "Plastics: Method of Determining Haze of Transparent Materials". A turbidity meter NDH-5000 manufactured by Nippon Denshoku Industries Co., Ltd. was used as a measuring instrument.

(4) Heat Shrinkage Rate (Heat Shrinkage Rates in MD and TD)

Measurement was carried out in accordance with JIS C 2318-1997 5.3.4 (Dimensional Change). A film was cut out in a size 10 mm width and 250 mm length with respect to the direction for the measurement and marked at 150 mm intervals. The intervals (A) between marks were measured under a constant tension of 5 gf. Subsequently, the film was put in an oven containing an atmosphere of 150° C. and subjected to a heating treatment at 150±3° C. for 30 minutes under no load. Thereafter, the intervals (B) between marks were measured under a constant tension of 5 gf. The heat shrinkage rate was calculated based on the following equation:

Heat shrinkage rate (%)=100(A−B)/A (5) Oxygen Transmission Rate (OTR)

The measurement was performed with oxygen supply from the PEF side with an oxygen transmission instrument (OX-TRAN2/21, manufactured by MOCON Inc.) under conditions represented by a temperature of 23° C. and a relative humidity of 65%.

(6) Water Vapor Transmission Rate (WVTR)

The measurement was performed with water vapor supply from the PEF side with a water vapor transmission instrument (PERMATRAN-W3/333, manufactured by MOCON Inc.) under conditions represented by a temperature of 37.8° C. and a relative humidity of 90%.

(7) Intrinsic Viscosity (IV)

A polyester resin was crushed and dried, and then was dissolved in a mixed solvent of p-chlorophenol and tetrachloroethane (75/25 in weight ratio). The flow time of each solution having a concentration of 0.4 g/dl and the flow time of the solvent alone were measured at 30° C. with an Ubbelohde viscometer, and from their time ratio was calculated an intrinsic viscosity according to the Huggins' expression under the assumption that the Huggins' constant was 0.38.

(8) Film Thickness

Four 5 cm-square samples were cut out with a Millitron from optional 4 positions within a region corresponding to 60% of the whole width toward both sides from the center in TD of a film to be measured, and were subjected to thickness measurement at 5 points per sample (20 points in total) with a thickness meter "Millitron 1254" manufactured by Mahr. The average value thereof was taken as thickness.

(9) Impact Strength

Strength of a film against impact punching under an atmosphere at 23° C. was measured with an impact tester manufactured by Toyo Seiki Seisaku-sho, Ltd. An impact sphere having a diameter of ½ inches was used. The unit of the strength was J, and the measured value was divided by the thickness of the film measured, and an evaluation value per 15 μm in thickness was used.

(10) Test of Oxygen Permeability of Packaging Bag i) Preparation of Packaging Bag A polyester-based adhesive was applied to the polyester films prepared in Examples, and then 40 μm-thick linear low density polyethylene films (L-LDPE films, L4102 manufactured by Toyobo Co., Ltd.) were dry-laminated to the films. This dry-lamination was followed by aging at 40° C. for three days to form laminated films. With the laminated films, three-side-sealed packaging bags having an inner size 70 mm width and 105 mm length were prepared.

ii) Preparation of Coloring Solution

A glass container was loaded with 2 L of water and 6.6 g of powdered agar. The container was put in hot water at 95° C. and heated for 1 hour or more to completely dissolve the agar. The solution was filtered with a 50-mesh metal net to remove gelled foreign matters. The solution was mixed with 0.04 g of methylene blue. The solution was evenly mixed with 1.25 g of sodium hydrosulfide in a glove box in which nitrogen had previously been flowed through for 15 minutes or more to obtain a coloring solution (uncolored).

iii) Charge With Coloring Solution

The three-side-sealed packaging bag was charged with about 30 mL of the coloring solution in the glove box in which nitrogen had previously been flowed through for 15 minutes or more. The three-side-sealed bag was filled with nitrogen and then sealed with a sealer to obtain a packaging bag filled with the coloring solution (packaging bag containing methylene blue coloring solution).

iv) Oxygen Permeability Test

After the agar was solidified at room temperature, the packaging bag containing the methylene blue coloring solution was transferred to a thermostatic chamber at 40° C. and a relative humidity of 90%, and color change was observed after 72 hours. The color change was judged according to the following criteria A and B, and A was regarded as acceptable (good).

A: Almost no color change was observed.

B: Significant color change was observed.

(11) Lamination Strength

A specimen was cut out from a laminate into a size 15 mm width and 200 mm length. A peel strength between a polyester film and a heat-sealable resin layer was measured at a peeling angle of 90° under conditions represented by a pulling speed of 200 mm/min, and was taken as lamination strength.

(12) Evaluation of Bag Break Resistance

A bag break resistance test was carried out by the following method by using packaging bags containing the methylene blue coloring solution prepared in the above (10). Under conditions of 5° C. and a relative humidity of 40%, 20 packaging bags were aligned in the height direction and were dropped from a height of 1 m to a steel floor. This operation was repeated 20 times. Then, a bag was judged as suffering breakage when the bag had broken, or the contents had leaked out of the bag, or the methylene blue agar solution contained in the bag had been colored severely after being aged for three days under conditions of 40° C. and a relative humidity of 90% even if no damage had been found in its appearance. In the evaluation, judgment was made according to the following criteria A, B and C, with A or B evaluated as having no problems (being good) in practical use.

A: The bag breaking rate was less than 10%.

B: The bag breaking rate was 10% or more and less than 20%.

C: The bag breaking rate was 20% or more.

Example 1

Poly(ethylene 2,5-furandicarboxylate) having an IV of 0.90 manufactured by Avantium was used as a raw material. The raw material was dried under reduced pressure (1 Torr) at 100° C. for 24 hours to decrease its water content to 100 ppm or less, and then was fed to a twin screw extruder (screw diameter: 30 mm, L/D=25). The raw materials fed to the twin screw extruder were melt-extruded through a metal cap in a sheet-like form while the resin temperature was kept at 270° C. from the melting part to the gear pump through the kneading part and the tube of the extruder and kept at 275° C. in the subsequent tube.

The resin extruded was cast on a cooling drum having a surface temperature of 20° C., closely attached to the surface of the cooling drum by an electrostatic application method, and thereby cooled and solidified to prepare an unstretched film having a thickness of 250 μm.

The obtained unstretched sheet was heated by a group of rolls each heated to 120° C. to increase a film temperature thereof. Thereafter, the heated sheet was stretched in MD at 5.0 times by a group of rolls differing in peripheral speed.

Subsequently, the obtained uniaxially stretched film was led to a tenter, held with clips, and then subjected to TD stretching. The conveying speed was set to 5 m/min. The TD stretch temperature was set to 105° C. and the TD stretch ratio was set to 5.0 times. Subsequently, the film was subjected to heat fixation at 200° C. for 12 seconds, and then subjected to a 5% relaxation treatment at 190° C., so that a polyester film having a furandicarboxylate unit was obtained. The heat fixation temperature could be raised to 200° C. as a result of performing MD stretching at 5 times at the MD stretch temperature adjusted to be 120° C. and performing TD stretching at 5 times at the TD stretch temperature adjusted to be 105° C. The obtained physical properties of the film are shown in Table 1.

As shown in Table 1, a polyester film excellent in heat-resistant dimensional stability, impact-resistant strength characteristics, mechanical properties, transparency, and gas barrier properties could be obtained.

Subsequently, the obtained biaxially stretched polyester film was laminated on one side thereof by a dry lamination method with a 70 μm-thick unstretched polypropylene film ("P1147" produced by Toyobo Co., Ltd.) (CPP) as a heat-sealable resin layer using a urethane-based two-component curable adhesive (mixture of "TAKELAC (registered trademark) A525S" and "TAKENATE (registered trademark) A50" produced by Mitsui Chemicals, Inc. in a ratio of 13.5:1 (mass ratio)), followed by aging at 40° C. for four days, and thus a laminate for evaluation was obtained. The thickness after drying of the adhesive layer formed from the urethane-based two-component curable adhesive was about 4 μm. The physical properties of the laminate obtained are shown in Table 1.

The laminate obtained in this Example had a lamination strength of 3.9 N/15 mm and was excellent in lamination strength. Moreover, the oxygen transmission was 100 mL/m$^2$/day/MPa and the water vapor transmission was 3.8 g/m$^2$/day. The result of an oxygen permeability test of a packaging bag was good and the evaluation of the bag break resistance test was also good.

Example 2

A laminate was obtained by laminating an unstretched polypropylene film to a polyester film obtained by the same method as that disclosed in Example 1 in the same manner as in Example 1 except that the thickness of the unstretched film was changed to 300 μm. The obtained physical properties of the film and the laminate are shown in Table 1.

As shown in Table 1, a polyester film excellent in heat-resistant dimensional stability, impact-resistant strength characteristics, mechanical properties, transparency, and gas barrier properties could be obtained.

As shown in Table 1, the laminate obtained in this Example had a lamination strength of 4.0 N/15 mm and was excellent in lamination strength. Moreover, the oxygen transmission was 75 mL/m$^2$/day/MPa and the water vapor transmission was 3.4 g/m$^2$/day. The result of an oxygen permeability test of a packaging bag was good and the evaluation of the bag break resistance test was also good.

Example 3

A 300 μm-thick unstretched film was obtained by the same method as Example 2 except that silica particles (Sylysia 310, produced by Fuji Silysia Chemical Ltd.) was used in an amount of 2000 ppm as an additive for the raw material.

Subsequently, the obtained unstretched sheet was heated by a group of rolls each heated to 120° C. to increase a film temperature thereof and thereafter stretched in MD at 5 times by a group of rolls differing in peripheral speed to obtain a uniaxially stretched film.

The obtained uniaxially stretched film was led to a tenter, held with clips, and then subjected to TD stretching. The conveying speed was set to 5 m/min. The stretch temperature in the stretching zone 2 was set to 105° C., and the TD stretch ratio was set to 5 times. Subsequently, a heat fixation treatment was performed at 200° C. for 12 seconds in the heat fixation zone 3 and a 5% relaxation treatment was performed at 190° C. as shown in Table 1. Immediately after that, film edges were released from clips at a release temperature of 180° C. in the release zone 5 to perform a release treatment at a longitudinal release rate of 9% to obtain a polyester film. The physical properties of the obtained film are shown in Table 1

As shown in Table 1, a polyester film excellent in heat-resistant dimensional stability, impact-resistant strength characteristics, mechanical properties, transparency, and gas barrier properties could be obtained.

A laminate was obtained by laminating an unstretched polypropylene film to the obtained polyester film in the same manner as in Example 1. The physical properties of the laminate obtained are shown in Table 1.

The laminate obtained in this example had a lamination strength of 4.2 N/15 mm and was excellent in lamination strength. Moreover, the oxygen transmission was 77 mL/m$^2$/day/MPa and the water vapor transmission was 3.5 g/m$^2$/day. The result of an oxygen permeability test of a packaging bag was good and the evaluation of the bag break resistance test was also good.

Example 4

A 300 μm-thick unstretched film was obtained by the same method as Example 3 except that silica particles (Sylysia 310, produced by Fuji Silysia Chemical Ltd.) was used in an amount of 1000 ppm as an additive for the raw material.

The obtained unstretched sheet was heated by a group of rolls each heated to 110° C. to increase a film temperature thereof and thereafter stretched in MD at 3.8 times by a group of rolls differing in peripheral speed to obtain a uniaxially stretched film. Then, a biaxially stretched polyester film was obtained by the same method as Example 1 except that the obtained uniaxially stretched film was led to a tenter, held with clips, stretched at a transverse stretch temperature of 105° C. and a transverse stretch ratio of 4.5 times, subsequently subjected to heat fixation at 190° C. for 12 seconds, and subjected to a 8% relaxation treatment at 190° C. Moreover, a laminate was obtained by laminating an unstretched polypropylene film in the same manner as disclosed in Example 1. The obtained physical properties of the polyester film and the physical properties of the laminate are shown in Table 1.

As shown in Table 1, a polyester film excellent in heat-resistant dimensional stability, impact-resistant strength characteristics, mechanical properties, transparency, and gas barrier properties could be obtained.

The laminate obtained in this Example had a lamination strength of 5.4 N/15 mm and was excellent in lamination strength. Moreover, the oxygen transmission was 60 mL/m$^2$/day/MPa and the water vapor transmission was 3.0 g/m$^2$/day. The result of an oxygen permeability test of a packaging bag was good and the evaluation of the bag break resistance test was also good.

Example 5

A polyester film obtained by the same method as disclosed in Example 1 was laminated on one side thereof by a dry lamination method with a 40 μm-thick linear low density polyethylene film ("L4102" produced by Toyobo Co., Ltd.) (LLDPE) as a heat-sealable resin layer using a urethane-based two-component curable adhesive (mixture of "TAKELAC (registered trademark) A525S" and "TAKENATE (registered trademark) A50" produced by Mitsui Chemicals, Inc. in a ratio of 13.5:1 (mass ratio)), followed by aging at 40° C. for four days, and thus a laminate for evaluation was obtained. The thickness after drying of the adhesive layer formed from the urethane-based two-component curable adhesive was about 4 μm. The physical properties of the polyester film obtained and the physical properties of the laminate are shown in Table 1.

The laminate obtained in this example had a lamination strength of 2.4 N/15 mm and was excellent in lamination strength. Moreover, the oxygen transmission was 105 mL/m$^2$/day/MPa and the water vapor transmission was 6.8 g/m$^2$/day. The result of an oxygen permeability test of a packaging bag was good and the evaluation of the bag break resistance test was also good.

Example 6

A laminate was obtained by laminating a linear low density polyethylene film to a polyester film obtained by the same method as disclosed in Example 2, in the same manner as in Example 5. The physical properties of the polyester film obtained and the physical properties of the laminate are shown in Table 1.

The laminate obtained in this example had a lamination strength of 2.3 N/15 mm and was excellent in lamination strength. Moreover, the oxygen transmission was 82 mL/m$^2$/day/MPa and the water vapor transmission was 5.8 g/m$^2$/day. The result of an oxygen permeability test of a packaging bag was good and the evaluation of the bag break resistance test was also good.

Example 7

A laminate was obtained by laminating a linear low density polyethylene film to a polyester film obtained by the same method as disclosed in Example 3, in the same manner as in Example 5. The physical properties of the obtained polyester film and the physical properties of the laminate are shown in Table 1.

The laminate obtained in this example had a lamination strength of 2.8 N/15 mm and was excellent in lamination strength. Moreover, the oxygen transmission was 81 mL/m$^2$/day/MPa and the water vapor transmission was 5.7 g/m$^2$/day. The result of an oxygen permeability test of a packaging bag was good and the evaluation of the bag break resistance test was also good.

Example 8

A laminate was obtained by laminating a linear low density polyethylene film to a polyester film obtained by the same method as disclosed in Example 4, in the same manner as in Example 5. The physical properties of the polyester film obtained and the physical properties of the laminate are shown in Table 1.

The laminate obtained in this example had a lamination strength of 4.0 N/15 mm and was excellent in lamination strength. Moreover, the oxygen transmission was 78 mL/m$^2$/day/MPa and the water vapor transmission was 5.2 g/m$^2$/day. The result of an oxygen permeability test of a packaging bag was good and the evaluation of the bag break resistance test was also good.

Comparative Example 1

(1) Production of PET Resin (A)

An esterification reactor was heated, and at the time when the temperature was reached 200° C., the reactor was charged with a slurry containing 86.4 parts by mass of terephthalic acid and 64.4 parts by mass of ethylene glycol. To the reactor were then added 0.017 parts by mass of antimony trioxide as a catalyst and 0.16 parts by mass of triethylamine under stirring. Subsequently, the temperature was raised under pressure and an esterification reaction under pressure was performed under the conditions represented by a gauge pressure of 3.5 kgf/cm$^2$ and a temperature of 240° C. Thereafter, the inside pressure of the esterification reactor was returned to normal pressure, and 0.071 parts by mass of magnesium acetate tetrahydrate and successively 0.014 parts by mass of trimethyl phosphate were added. The reactor was further heated to 260° C. over 15 minutes, and 0.012 parts by mass of trimethyl phosphate and successively 0.0036 parts by mass of sodium acetate were added. After 15 minutes, the obtained esterification reaction product was transferred to a polycondensation reactor, gradually heated from 260° C. to 280° C. under reduced pressure, and then subjected to a polycondensation reaction at 285° C.

After the completion of the polycondensation reaction, the reaction product was filtered by a NASLON filter having a 95% cut diameter of 5 μm, extruded from a nozzle in a strand-like form, cooled and solidified with cooling water which had previously been subjected to a filter treatment (pore diameter: 1 μm or less), and cut into pellets. The obtained PET resin (A) had a melting point of 257° C. and an intrinsic viscosity of 0.62 dl/g. The PET resin (A) contained substantially no inactive particles and no internally-deposited particles.

(2) Production of PET Resin (B)

Polyethylene terephthalate containing 2000 ppm of silica particles (Sylysia 310, average particle diameter of 2.7 μm, manufactured by Fuji Silysia Chemical Ltd.) as an additive was prepared in the same production manner as that for the PET (A) resin.

(3) Production of Biaxially Stretched Polyethylene Terephthalate Film

As raw materials for a surface layer (a), 70 parts by mass of pellets of the PET resin (A) and 30 parts by mass of pellets of the PET resin (B) were mixed and dried under reduced pressure (1 Torr) at 135° C. for 6 hours, and thereafter fed to an extruder 1. Moreover, as raw materials for an intermediate layer (b), 82 parts by mass of pellets of the PET resin (A) and 18 parts by mass of pellets of the PET resin (B) were mixed and dried under reduced pressure (1 Torr) at 135° C. for 6 hours, and thereafter fed to an extruder 2. The respective raw materials fed to the extruder 2 and the extruder 1 were laminated in a manner to constitute a/b/a with a 3-layer joining block and then melt-extruded through a metal cap in a sheet-like form while the resin temperature was kept at 280° C. from the melting part to the filter through the kneading part, the tube and the gear pump of the extruder and kept at 275° C. in the subsequent polymer tube. The thickness ratio of the a layer and the b layer was controlled with the gear pumps for the respective layers in a manner that the ratio of a/b/a became 8/84/8. A filter medium made of sintered stainless steel (nominal filtration precision: 10 μm particles are cut in a proportion of 95%) was used for all of the filters. The temperature of the metal cap was controlled in a manner that the temperature of the extruded resin was adjusted to 275° C.

The extruded resin was cast on a cooling drum having a surface temperature of 30° C., closely attached to the surface of the cooling drum by an electrostatic application method, and thus solidified with cooling to prepare an unstretched film having a thickness of 170 μm.

The obtained unstretched sheet was heated to a film temperature of 100° C. by a group of rolls each heated to 78° C., and thereafter stretched in MD at 3.5 times by a group of rolls differing in peripheral speed.

Subsequently, the obtained uniaxially stretched film was held with clips and stretched in TD. The temperature for stretching in TD was set to 120° C. and the stretch ratio was set to 4.0 times. Subsequently, the film was subjected to heat fixation at 240° C. for 15 seconds, and then subjected to a 4% relaxation treatment at 185° C. to obtain a biaxially stretched polyethylene terephthalate film having a thickness of 12 μm. A laminate was obtained by laminating an unstretched polypropylene film to the obtained polyester film in the same manner as in Example 1. The physical properties of the film obtained and the physical properties of the laminate are shown in Table 1.

Comparative Example 2

A laminate was obtained by laminating a linear low density polyethylene film to the polyester film obtained by the same method as in Comparative Example 1 in the same manner as in Example 5. The physical properties of the obtained film and the physical properties of the laminate are shown in Table 1.

| | | | | Example 1 | Example 2 | Example 3 | Example 4 | Example 5 |
|---|---|---|---|---|---|---|---|---|
| production conditions of polyester film | stretch ratio | MD | (—) | 5.0 | 5.0 | 5.0 | 3.8 | 5.0 |
| | stretch temperature | | (° C.) | 120 | 120 | 120 | 110 | 120 |
| | stretch ratio | TD | (—) | 5.0 | 5.0 | 5.0 | 4.5 | 5.0 |
| | stretch temperature | | (° C.) | 105 | 105 | 105 | 105 | 105 |
| | heat fixation temperature | | (° C.) | 200 | 200 | 200 | 190 | 200 |
| | relaxation ratio | TD | (%) | 5 | 5 | 5 | 8 | 5 |
| | relaxation temperature | | (° C.) | 190 | 190 | 190 | 190 | 190 |
| | release temperature in in-step release treatment | | (° C.) | — | — | 180 | — | — |
| | longitudinal release rate | | (%) | — | — | 9 | — | — |
| physical properties of polyestor film | breaking strength | MD | (MPa) | 275 | 260 | 249 | 214 | 275 |
| | | TD | (MPa) | 252 | 255 | 247 | 237 | 252 |
| | breaking elongation | MD | (%) | 47 | 47 | 55 | 117 | 47 |
| | | TD | (%) | 46 | 42 | 56 | 95 | 46 |
| | refractive index | Nx | (—) | 1.6317 | 1.6292 | 1.6234 | 1.6062 | 1.6317 |
| | | Ny | (—) | 1.6219 | 1.6242 | 1.6214 | 1.6240 | 1.6219 |
| | | Nz | (—) | 1.4839 | 1.4801 | 1.4812 | 1.5016 | 1.4839 |
| | plane orientation coefficient (ΔP) | | (—) | 0.143 | 0.147 | 0.141 | 0.114 | 0.143 |
| | heat shrinkage rate | MD | (%) | 3.3 | 4.3 | 2.0 | 2.9 | 3.3 |
| | | TD | (%) | 4.3 | 4.3 | 0.5 | 0.5 | 4.3 |
| | haze | | (%) | 0.4 | 0.3 | 6.8 | 2.8 | 0.4 |
| | total light transmittance | | (%) | 88.9 | 89.1 | 88.0 | 88.1 | 89.1 |
| | impact strength | @15 μm | (J) | 1.1 | 1.2 | 1.3 | 0.6 | 1.1 |
| | thickness | | (μm) | 12.0 | 15.5 | 15.5 | 22.7 | 12.0 |
| | oxygen transmission rate | measured value | (mL/m²/day/MPa) | 107 | 85 | 85 | 63 | 107 |
| | water vapor transmission rate | measured value | (g/m²/day) | 15.6 | 10.8 | 10.8 | 8.2 | 15.6 |
| | IV | | (dL/g) | 0.7 | 0.7 | 0.7 | 0.7 | 0.7 |
| laminate physical properties of laminate | laminated sealant | | (—) | CPP | CPP | CPF | CPP | LLDPE |
| | thickness | | (μm) | 84.0 | 87.5 | 87.5 | 94.7 | 54.0 |
| | oxygen transmission rate | measured value | (mL/m²/day/MPa) | 100 | 75 | 77 | 50 | 105 |
| | water vapor transmission rate | measured value | (g/m²/day) | 3.8 | 34 | 3.5 | 3.0 | 6.8 |
| | lamination strength | | (N/15 mm) | 3.9 | 4.0 | 4.2 | 5.4 | 2.4 |
| | oxygen permeability test of a packaging bag | | | A | A | A | A | A |
| | evaluation of bag break resistance | | | A | A | A | A | B |

-continued

| | | | | Example 6 | Example 7 | Example 8 | Comparative Example 1 | Comparative Example 2 |
|---|---|---|---|---|---|---|---|---|
| production conditions of polyester film | stretch ratio | MD | (—) | 5.0 | 5.0 | 3.8 | 3.5 | 3.5 |
| | stretch temperature | | (° C.) | 120 | 120 | 110 | 100 | 100 |
| | stretch ratio | TD | (—) | 5.0 | 5.0 | 4.5 | 4.0 | 4.0 |
| | stretch temperature | | (° C.) | 105 | 105 | 105 | 120 | 100 |
| | heat fixation temperature | | (° C.) | 200 | 200 | 190 | 240 | 240 |
| | relaxation ratio | TD | (%) | 5 | 5 | 8 | 4 | 4 |
| | relaxation temperature | | (° C.) | 190 | 190 | 190 | 185 | 185 |
| | release temperature in in-step release treatment | | (° C.) | — | 180 | — | — | — |
| | longitudinal release rate | | (%) | — | 9 | — | — | — |
| physical properties of polyester film | breaking strength | MD | (MPa) | 260 | 249 | 214 | 230 | 230 |
| | | TD | (MPa) | 255 | 247 | 237 | 240 | 240 |
| | breaking elongation | MD | (%) | 47 | 55 | 117 | 100 | 100 |
| | | TD | (%) | 42 | 56 | 95 | 90 | 90 |
| | refractive index | Nx | (—) | 1.6292 | 1.6234 | 1.6062 | 1.6537 | 1.6537 |
| | | Ny | (—) | 1.6242 | 1.6214 | 1.6240 | 1.6732 | 1.6732 |
| | | Nz | (—) | 1.4801 | 1.4812 | 1.5016 | 1.4959 | 1.4959 |
| | plane orientation coefficient (ΔP) | | (—) | 0.147 | 0.141 | 0.114 | 0.168 | 0.168 |
| | heat shrinkage rate | MD | (%) | 4.3 | 2.0 | 29 | 1.4 | 1.4 |
| | | TD | (%) | 4.3 | 0.5 | 0.5 | 0.2 | 0.2 |
| | haze | | (%) | 0.3 | 6.8 | 2.8 | 2.3 | 2.3 |
| | total light transmittance | | (%) | 88.0 | 88.1 | 88.0 | 88.0 | |
| | impact strength | @15 μm | (J) | 1.2 | 1.3 | 0.6 | 0.6 | 0.6 |
| | thickness | | (μm) | 15.5 | 15.5 | 22.7 | 12.0 | 12.0 |
| | oxygen transmission rate | measured value | (mL/m$^2$/day/MPa) | 85 | 85 | 63 | 1200 | 1200 |
| | water vapor transmission rate | measured value | (g/m$^2$/day) | 10.8 | 10.8 | 8.2 | 46.0 | 46.0 |
| | IV | | (dL/g) | 0.7 | 0.7 | 0.7 | 0.6 | 0.6 |
| laminate | laminated sealant | | (—) | LLDPE | LLDPE | LLDPE | CPP | LLDPE |
| | thickness | | (μm) | 57.5 | 57.5 | 64.7 | 84.0 | 54.0 |
| physical properties of laminate | oxygen transmission rate | measured value | (mL/m$^2$/day/MPa) | 82 | 81 | 78 | 1000 | 1100 |
| | water vapor transmission rate | measured value | (g/m$^2$/day) | 5.8 | 5.7 | 5.2 | 4.6 | 100 |
| | lamination strength | | (N/15 mm) | 2.3 | 2.8 | 4.0 | 5.6 | 3.1 |
| | oxygen permeability test of a packaging bag | | | A | A | A | B | B |
| | evaluation of bag break resistance | | | B | B | A | A | B |

DESCRIPTION OF REFERENCE SIGNS

1: Preheating zone
2: Stretching zone
3: Heat fixation zone
4, 5: Release zone
6: Cooling zone
7: Clip

The invention claimed is:

1. A laminate comprising a polyester film and a heat-sealable resin layer, wherein
the polyester film is a biaxially oriented polyester film comprising a polyethylene furandicarboxylate resin composed of a furandicarboxylic acid and ethylene glycol,
a plane orientation coefficient ΔP of the film is 0.100 or more and 0.160 or less,
a thickness of the film is 1 μm or more and 300 μm or less,
a heat shrinkage rate of the film is 10% or less when the film is heated at 150° C. for 30 minutes, and
lamination strength of the laminate is 2.0 N/15 mm or more.

2. The laminate according to claim 1, wherein the laminate has an oxygen transmission of 1 mL/m$^2$/day/MPa or more and 200 mL/m$^2$/day/MPa or less under a temperature of 23° C. and a relative humidity of 65%.

3. A packaging bag comprising the laminate according to claim 2.

4. A packaging bag comprising the laminate according to claim 1.

* * * * *